US012792218B2

(12) United States Patent
Jeong

(10) Patent No.: US 12,792,218 B2
(45) Date of Patent: Nov. 10, 2026

(54) STORAGE DEVICE INCLUDING NONVOLATILE MEMORY DEVICE, OPERATING METHOD THEREOF, AND OPERATING METHOD OF NONVOLATILE MEMORY DEVICE

(71) Applicant: SAMSUNG ELECTRONICS CO., LTD., Suwon-si (KR)

(72) Inventor: Yong-Taek Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 18/790,631

(22) Filed: Jul. 31, 2024

(65) Prior Publication Data

US 2025/0264996 A1 Aug. 21, 2025

(30) Foreign Application Priority Data

Feb. 16, 2024 (KR) ........................ 10-2024-0022397

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01); *G06F 2212/7203* (2013.01)

(58) Field of Classification Search
CPC .... G06F 3/0613; G06F 3/0659; G06F 3/0679; G06F 3/061; G06F 3/0604; G06F 3/0614; G06F 3/0658; G06F 2212/1016; G06F 2212/1032; G06F 2212/7203
See application file for complete search history.

(56) References Cited

U.S. PATENT DOCUMENTS 9,135,192 B2 * 9/2015 Lin .................... G06F 13/1626
9,152,553 B1 10/2015 Shin et al.
9,910,600 B2 3/2018 Buxton et al.
9,996,457 B2 6/2018 Post et al.
11,698,754 B2 7/2023 Mcjilton et al.
2016/0162186 A1 6/2016 Kashyap et al.
2016/0202914 A1 * 7/2016 Hsu ...................... G06F 3/0683 711/158
2016/0283111 A1 * 9/2016 Guo ...................... G06F 3/0655
2018/0232325 A1 * 8/2018 Choi ...................... G06F 3/061
2021/0233593 A1 7/2021 Palmer
2022/0083266 A1 3/2022 Prakash et al.
2023/0068605 A1 * 3/2023 Sankaranarayanan ...................... G06F 3/061
2023/0229356 A1 7/2023 Madraswala et al.
2024/0192887 A1 * 6/2024 Bai .................... G06F 13/1657

FOREIGN PATENT DOCUMENTS

CN 108628759 A 10/2018

* cited by examiner

*Primary Examiner* — Kalpit Parikh
(74) *Attorney, Agent, or Firm* — Sughrue Mion, PLLC

(57) ABSTRACT

Provided is a storage device and a method of operating same, the storage device including: a nonvolatile memory device including a first plane and a second plane; and a storage controller configured to sequentially send to the nonvolatile memory device a first command corresponding to a first operation of the first plane, a second command corresponding to a second operation of the first plane, and a third command corresponding to a third operation of the second plane, wherein the nonvolatile memory device is configured to perform the third operation prior to the second operation based on the first, the second, and the third commands.

18 Claims, 19 Drawing Sheets

RCI

| | Processing Order | CMD Type | ADDR |
|---|---|---|---|
| CCMD1 | 1st | Read | P1B0,P2B3 |
| RD2 | 2nd | Read | P1B1 |

STORAGE DEVICE INCLUDING NONVOLATILE MEMORY DEVICE, OPERATING METHOD THEREOF, AND OPERATING METHOD OF NONVOLATILE MEMORY DEVICE

CROSS-REFERENCE TO RELATED APPLICATIONS

This application is based on and claims priority to Korean Patent Application No. 10-2024-0022397 filed on Feb. 16, 2024, in the Korean Intellectual Property Office, the disclosure of which is incorporated by reference herein in its entirety.

BACKGROUND

1. Field

The present disclosure relates to a semiconductor memory, and more particularly, to a storage device including a nonvolatile memory device, an operating method thereof, and an operating method of the nonvolatile memory device.

2. Description of Related Art

A semiconductor memory is classified as a volatile memory device, which loses data stored therein when a power is turned off, such as a static random access memory (SRAM), a dynamic RAM (DRAM), or a synchronous DRAM (SDRAM), or as a nonvolatile memory, which retains data stored therein even when a power is turned off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), or a ferroelectric RAM (FRAM).

The flash memory device is widely used as a high-capacity storage medium of a user device. As computing technologies develop, a flash memory-based high-capacity storage medium requires improved performance. Various techniques or devices are being developed to improve the performance of flash memory-based high-capacity storage media.

SUMMARY

Provided is a storage device including a nonvolatile memory device with improved performance, an operating method thereof, and an operating method of the nonvolatile memory device.

According to an aspect of the disclosure, a storage device includes: a nonvolatile memory device including a first plane and a second plane; and a storage controller configured to sequentially send to the nonvolatile memory device a first command corresponding to a first operation of the first plane, a second command corresponding to a second operation of the first plane, and a third command corresponding to a third operation of the second plane, wherein the nonvolatile memory device is configured to perform the third operation prior to the second operation based on the first, the second, and the third commands.

According to an aspect of the disclosure, a method of operating a storage device includes: sequentially sending to a nonvolatile memory device of the storage device, by a storage controller of the storage device, a first command corresponding to a first operation of a first plane of the nonvolatile memory device, a second command corresponding to a second operation of the first plane, and a third command corresponding to a third operation of a second plane of the nonvolatile memory device; and performing, by the nonvolatile memory device, the third operation prior to the second operation based on the first, the second, and the third commands.

According to an aspect of the disclosure a method of operating a nonvolatile memory device, which includes a first plane and a second plane, includes: sequentially receiving a first command corresponding to a first operation of the first plane, a second command corresponding to a second operation of the first plane, and a third command corresponding to a third operation of the second plane; queuing, in a command queue, a first operation command corresponding to the first command, a second operation command corresponding to the second command, and a third operation command corresponding to the third command, wherein the first, the second, and the third operation commands are queued in an order in which the first, the second, and the third operation commands are received; and performing the first, the second, and the third operations based on the order in which the first, the second, and the third operation commands, regardless of the order in which the first, the second, and the third commands are received.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, embodiments of the present disclosure will be described in detail and clearly to such an extent that one skilled in the art easily carries out the present disclosure.

In the specification, function blocks of drawings, which respectively correspond to the terms "block", "unit", "logic", etc., may be implemented in the form of software, hardware, or a combination thereof. As used herein, a plurality of "units", "modules", "members", and "blocks" may be implemented as a single component, or a single "unit", "module", "member", and "block" may include a plurality of components.

It will be understood that when an element is referred to as being "connected" with or to another element, it can be directly or indirectly connected to the other element, wherein the indirect connection may include "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

As used herein, the expressions "at least one of a, b or c" and "at least one of a, b and c" indicate "only a," "only b," "only c," "both a and b," "both a and c," "both b and c," and "all of a, b, and c."

It will be understood that, although the terms "first", "second", "third", etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

With regard to any method or process described herein, an identification code may be used for the convenience of the description but is not intended to illustrate the order of each step or operation. Each step or operation may be implemented in an order different from the illustrated order unless the context clearly indicates otherwise. One or more steps or operations may be omitted unless the context of the disclosure clearly indicates otherwise.

Figure 1:
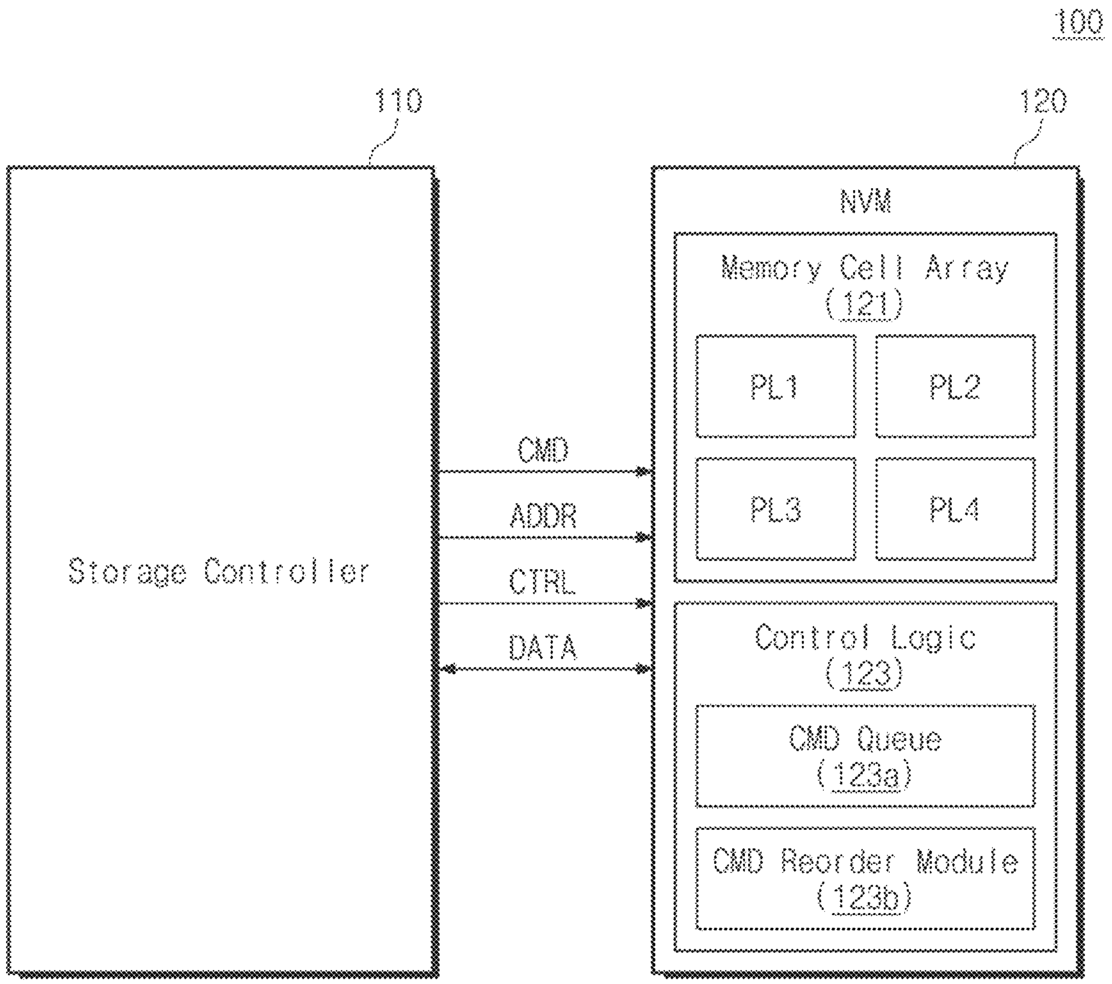
FIG. 1 is a block diagram illustrating a storage device according to an embodiment of the present disclosure.

FIG. 1 is a block diagram illustrating a storage device according to an embodiment of the present disclosure. Referring to FIG. 1, a storage device 100 may include a storage controller 110 and a nonvolatile memory device (NVM) 120. In an embodiment, the storage device 100 may be a high-capacity storage medium such as a solid state drive (SSD), a memory card, or a memory stick.

The storage controller 110 may control all the operations of the storage device 100. For example, based on a request from an external host, the storage devices 100 may store data "DATA" in the nonvolatile memory device 120 or may read the data "DATA" stored in the nonvolatile memory device 120. For example, the storage controller 110 may provide an address ADDR, a command CMD, and a control signal CTRL to the nonvolatile memory device 120 and may exchange the data "DATA" with the nonvolatile memory device 120. In an embodiment, for an efficient operation of the storage device 100, the storage controller 110 may perform various maintenance operations (e.g., wear leveling, garbage collection, and bad block management).

Under control of the storage controller 110, the nonvolatile memory device 120 may store the data "DATA" or may output the stored data "DATA". In an embodiment, the nonvolatile memory device 120 may include a NAND flash memory. However, the present disclosure is not limited thereto.

The nonvolatile memory device 120 may include a memory cell array 121 and control logic 123. The memory cell array 121 may include first to fourth planes PL1 to PL4. Each of the first to fourth planes PL1 to PL4 may include a plurality of memory blocks. In an embodiment, the plurality of memory blocks included in the first plane PL1 may share the same bit lines, the plurality of memory blocks included in the second plane PL2 may share the same bit lines, the plurality of memory blocks included in the third plane PL3 may share the same bit lines, and the plurality of memory blocks included in the fourth plane PL4 may share the same bit lines.

The control logic 123 may control all the operations of the nonvolatile memory device 120. The control logic 123 may generate signals for controlling the memory cell array 121. The control logic 123 may be implemented as a digital signal processor (DSP) processing digital signals, a microprocessor, and a time controller (TCON). However, the disclosure is not limited thereto, and the control logic 123 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the control logic 123 may be implemented as a system on chip (SoC) having a processing algorithm stored therein or large scale integration (LSI), or in the form of a field programmable gate array (FPGA). The control logic 123 may perform various functions by executing computer executable instructions stored in a cache or a memory.

In an embodiment, the nonvolatile memory device 120 according to the present disclosure may perform an independent operation on each of the first to fourth planes PL1 to PL4 under control of the control logic 123. In detail, for example, the nonvolatile memory device 120 may simultaneously (i.e., in parallel) perform read operations on the first to fourth planes PL1 to PL4. In other words, the nonvolatile memory device 120 may perform read operations through a multi-plane operation. Also, for example, the nonvolatile memory device 120 may start the execution of the read operation on the second plane PL2 while the read operation on the first plane PL1 is being performed. In other words, the nonvolatile memory device 120 may perform the read operations through a plane independent read (PIR) operation.

The nonvolatile memory device 120 may perform operations on the first to fourth planes PL1 to PL4 in response to the command CMD from the storage controller 110. For example, the nonvolatile memory device 120 may sequentially receive a first read command for the first plane PL1, a second read command for the first plane PL1, and a third read command for the second plane PL2 from the storage controller 110.

Because the first read command and the second read command correspond to the same plane, that is, the first plane PL1, the first read command and the second read command may not be simultaneously processed. However, because the first read command and the third read command correspond to different planes PL1 and PL2, the first read command and the third read command may be simultaneously processed through a multi-plane operation.

Even though the nonvolatile memory device 120 is capable of simultaneously processing the first read command and the third read command, the nonvolatile memory device 120 may process the first read command and the third read command in order. That is, the nonvolatile memory device 120 may complete the first read operation of the first plane PL1 in response to the first read command, may complete the second read operation of the first plane PL1 in response to the second read command, and may complete the third read operation of the second plane PL2 in response to the third read command.

In this case, the operating speed of the nonvolatile memory device 120 may be relatively slow compared to the case where the first and third read commands are simultaneously processed (i.e., the first read operation of the first plane PL1 and the third read operation of the second plane PL2 are simultaneously performed) and the second read command is processed. In other words, when the nonvolatile memory device 120 processes commands from the storage controller 110 in an out-of-order manner, the performance of the nonvolatile memory device 120 may be improved.

The nonvolatile memory device 120 according to an embodiment of the present disclosure may change the order of processing commands CMD received from the storage controller 110 under control of the control logic 123. That is, the nonvolatile memory device 120 according to an embodiment of the present disclosure may process the commands CMD received from the storage controller 110 in the out-of-order manner under control of the control logic 123.

The control logic 123 may include a command queue 123*a* and a command reorder module 123*b*. The commands CMD from the storage controller 110 may be added to the command queue 123*a*. The command reorder module 123*b* may combine entries stored in the command queue 123*a* and may determine the order of processing the commands CMD. Operations of the command queue 123*a* and the command reorder module 123*b* will be described in detail with reference to FIG. 7.

Figure 2:
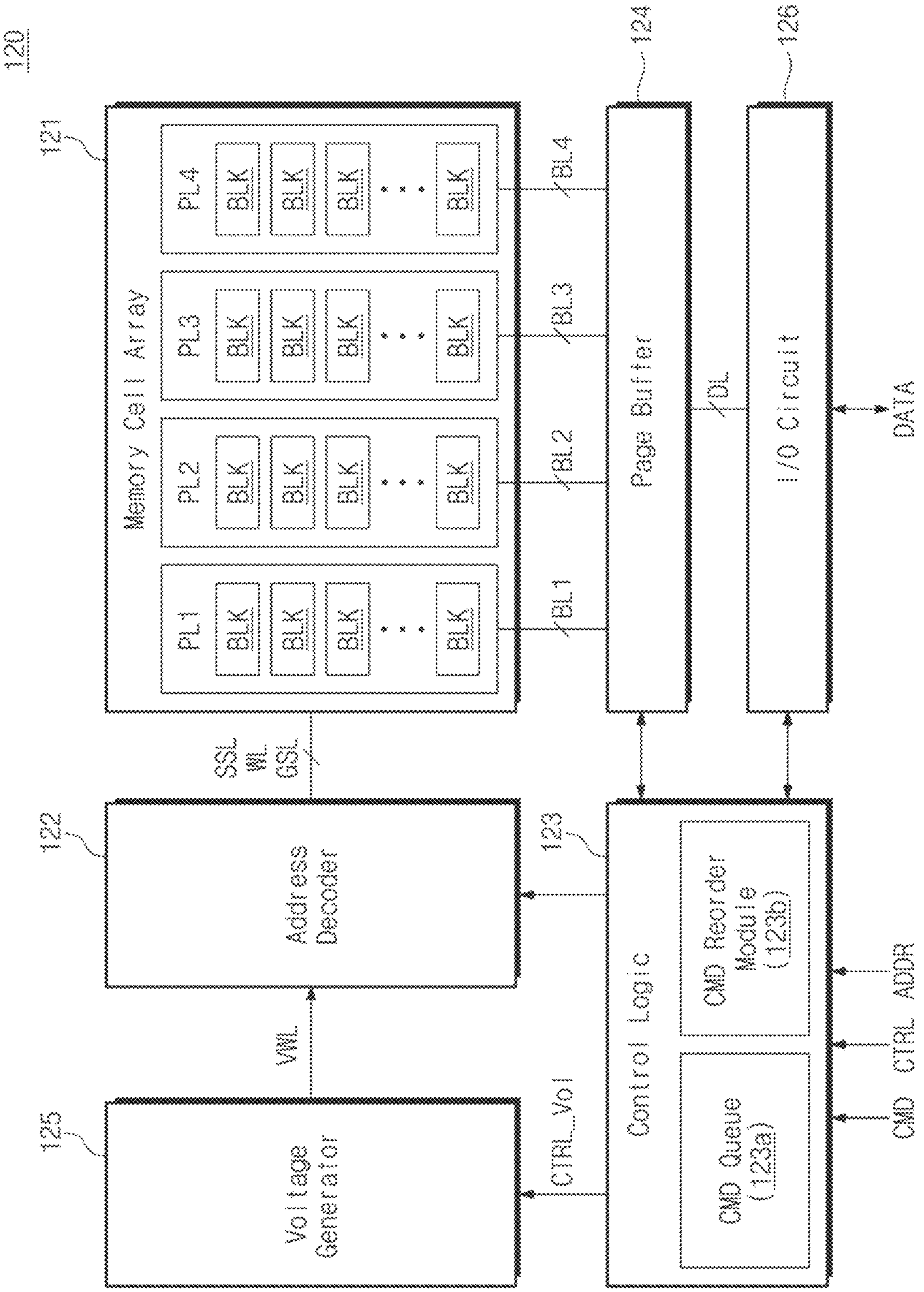
FIG. 2 is a block diagram illustrating a nonvolatile memory device of FIG. 1.

FIG. 2 is a block diagram illustrating a nonvolatile memory device of FIG. 1. Referring to FIGS. 1 and 2, the nonvolatile memory device 120 may include the memory cell array 121, an address decoder 122, the control logic 123, a page buffer 124, a voltage generator 125, and an input/output circuit 126.

The memory cell array 121 may include the first to fourth planes PL1 to PL4. Each of the first to fourth planes PL1 to PL4 may include a plurality of memory blocks BLK. In each of the first to fourth planes PL1 to PL4, each of the plurality of memory blocks BLK may be connected to the address decoder 122 through word lines WL and string selection lines SSL.

The plurality of memory blocks BLK included in the first plane PL1 may be connected to the page buffer 124 through first bit lines BL1. That is, the plurality of memory blocks BLK included in the first plane PL1 may share the first bit lines BL1. The plurality of memory blocks BLK included in the second plane PL2 may be connected to the page buffer 124 through second bit lines BL2. That is, the memory blocks BLK included in the second plane PL2 may share the second bit lines BL2. The plurality of memory blocks BLK included in the third plane PL3 may be connected to the page buffer 124 through third bit lines BL3. That is, the memory blocks BLK included in the third plane PL3 may share the third bit lines BL3. The plurality of memory blocks BLK included in the fourth plane PL4 may be connected to the page buffer 124 through fourth bit lines BL4. That is, the memory blocks BLK included in the fourth plane PL4 may share the fourth bit lines BL4.

The address decoder 122 may be connected to the memory cell array 121 through the string selection lines SSL, the word lines WL, and ground selection lines GSL. The address decoder 122 may control or drive the string selection lines SSL, the word lines WL, and the ground selection lines GSL.

The control logic 123 may control an operation of the nonvolatile memory device 120 in response to the command CMD, the control logic CTRL, and the address information ADDR from the storage controller 110. For example, the control logic 123 may control the address decoder 122, the page buffer 124, and the voltage generator 125, and the input/output circuit 126 in response to the command CMD such that an operation (e.g., a program operation, a read operation, or an erase operation) corresponding to the command CMD is performed. The control logic 123 may provide a row address to the address decoder 122, may provide a column address to the page buffer 124, and may provide a voltage control signal CTRL_Vol to the voltage generator 125. Also, as described with reference to FIG. 1, the control logic 123 may combine commands based on the command queue 123*a* and the command reorder module 123*b* and may reorder the order of the commands.

The page buffer 124 is connected to the memory blocks BLK included in the first plane PL1 through the first bit lines BL1, is connected to the memory blocks BLK included in the second plane PL2 through the second bit lines BL2, is connected to the memory blocks BLK included in the third plane PL3 through the third bit lines BL3, and is connected to the memory blocks BLK included in the fourth plane PL4 through the fourth bit lines BL4. The page buffer 124 may temporarily store data to be stored in the memory cell array 121 or data read from the memory cell array 121.

The voltage generator 125 may generate various kinds of voltages for performing the write, read, and erase operations on the memory cell array 121, based on the voltage control signal CTRL_Vol. In detail, the voltage generator 125 may be configured to generate a word line voltage VWL, for example, a plurality of program voltages, a plurality of program verify voltages, a plurality of pass voltages, a plurality of read voltages, and a soft erase voltage, etc.

The input/output circuit 126 may be connected to the page buffer 124 through data lines DL and may exchange the data "DATA" with the page buffer 124 through the data lines DL. Under control of the control logic 123, the input/output circuit 126 may send the data "DATA" to the storage controller 110 or may receive the data "DATA" from the storage controller 110.

In an embodiment, the nonvolatile memory device 120 may receive the command/address CMD/ADDR from the storage controller 110 through a first transfer path and may exchange the data "DATA" with the storage controller 110 through a second transfer path. That is, in an embodiment, a line through which the nonvolatile memory device 120 receives the command/address CMD/ADDR and a line through which the nonvolatile memory device 120 exchanges the data "DATA" may be separated from each other. In an embodiment, the nonvolatile memory device 120 may include a command/address pin for receiving the command/address CMD/ADDR, separately from a data input/output pin. However, the present disclosure is not limited thereto. For example, the nonvolatile memory device 120 may receive all of the data "DATA", the command CMD, and the address ADDR from the storage controller 110 through the data input/output pin.

Figure 3:
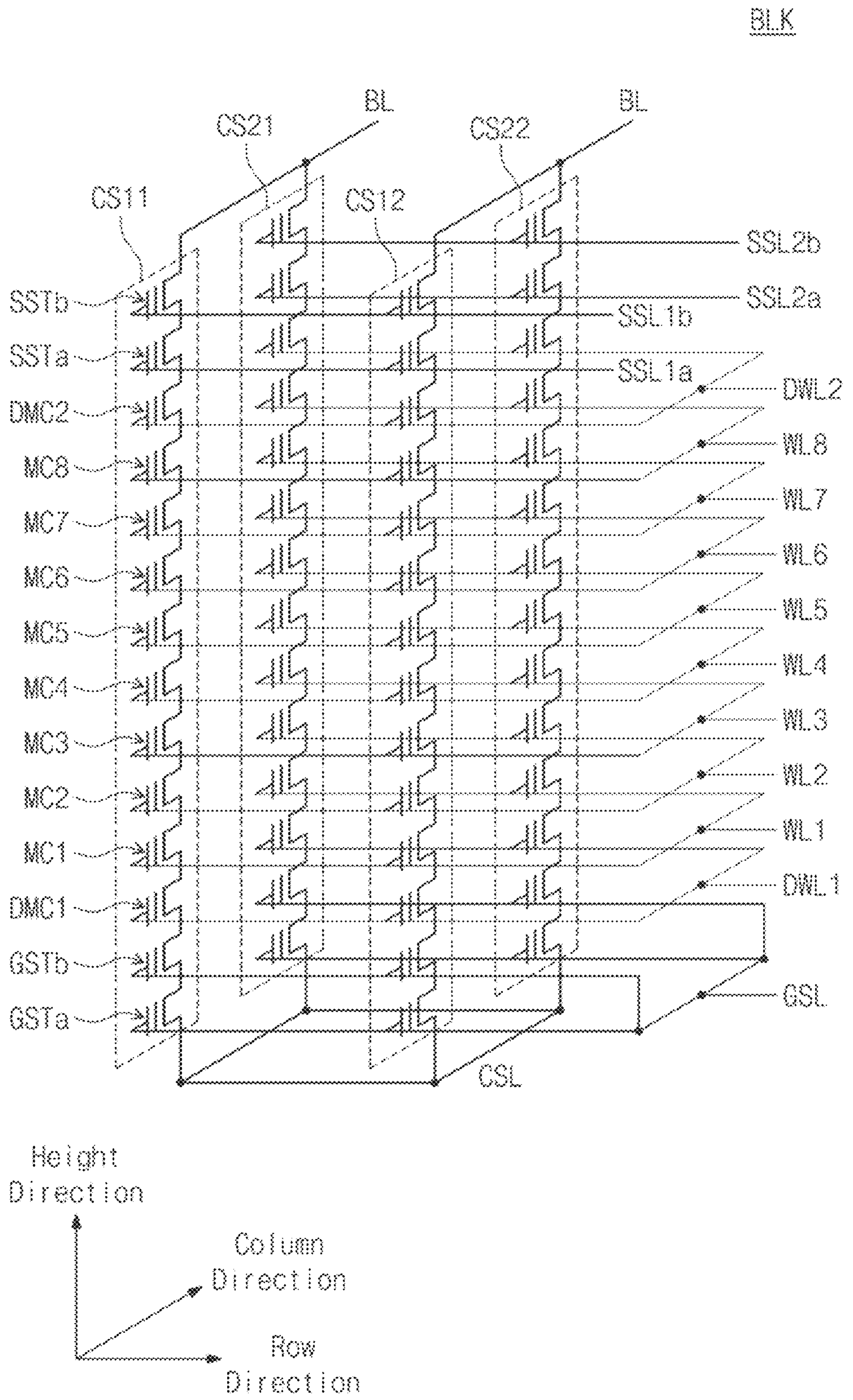
FIG. 3 is a circuit diagram illustrating a memory block of FIG. 2.

FIG. 3 is a circuit diagram illustrating a memory block of FIG. 2. One memory block BLK will be described with reference to FIG. 3, but the present disclosure is not limited thereto. The plurality of memory blocks BLK included in the memory cell array 121 of FIG. 2 may have a structure which is similar to or the same as that of the memory block BLK of FIG. 3. Referring to FIGS. 2 and 3, the memory block BLK may include a plurality of cell strings CS11, CS12, CS21, and CS22. The plurality of cell strings CS11, CS12, CS21, and CS22 may be arranged in a row direction and a column direction.

Cell strings located at the same column from among the plurality of cell strings CS11, CS12, CS21, and CS22 may be connected to the same bit line. For example, if the memory block BLK of FIG. 3 is a memory block included in the first plane PL1 of FIG. 2, the bit lines BL of FIG. 3 may correspond to the first bit lines BL1 of FIG. 2. Each of the plurality of cell strings CS11, CS12, CS21, and CS22 includes a plurality of cell transistors. Each of the plurality of cell transistors may be a charge trap flash (CTF) memory cell transistor, but the present disclosure is not limited thereto. The plurality of cell transistors may be stacked on a plane (e.g., a semiconductor substrate) defined by the row direction and the column direction.

The plurality of cell transistors in each cell string may be connected in series between the corresponding bit line (e.g., BL1 or BL2) and the common source line CSL. For example, the plurality of cell transistors may include string selection transistors SSTa and SSTb, dummy memory cells DMC1 and DMC2, memory cells MC1 to MC8, and ground selection transistors GSTa and GSTb. The serially-connected string selection transistors SSTa and SSTb may be provided or connected between the serially-connected memory cells MC1 to MC8 and the corresponding bit line (e.g., BL1 and BL2). The serially-connected ground selection transistors GSTa and GSTb may be provided or connected between the serially-connected memory cells MC1 to MC8 and a common source line CSL.

In each of the plurality of cell strings CS11, CS12, CS21, and CS22, memory cells located at the same height from among the memory cells MC1 to MC8 may share the same word line.

Dummy memory cells located at the same height from among the dummy memory cells DMC1 and DMC2 of the plurality of cell strings CS11, CS12, CS21, and CS22 may share the same dummy word line.

String selection transistors located at the same height and the same row from among the string selection transistors SSTa and SSTb of the plurality of cell strings CS11, CS12, CS21, and CS22 may share the same string selection line.

String selection transistors located at the same row from among the string selection transistors SSTa and SSTb of the plurality of cell strings CS11, CS12, CS21, and CS22 may share the same string selection line.

Ground selection transistors placed at the same height and the same row from among the ground selection transistors GSTa and GSTb of the plurality of cell strings CS11, CS12, CS21, and CS22 may be connected to the same ground selection line.

The ground selection transistors GSTa and GSTb of the plurality of cell strings CS11, CS12, CS21, and CS22 may share the same ground selection line. Alternatively, ground selection transistors located at the same height from among the ground selection transistors GSTa and GSTb of the plurality of cell strings CS11, CS12, CS21, and CS22 may share the same ground selection line. Alternatively, ground selection transistors located at the same row from among the ground selection transistors GSTa and GSTb of the plurality of cell strings CS11, CS12, CS21, and CS22 may share the same ground selection line.

Figure 4:
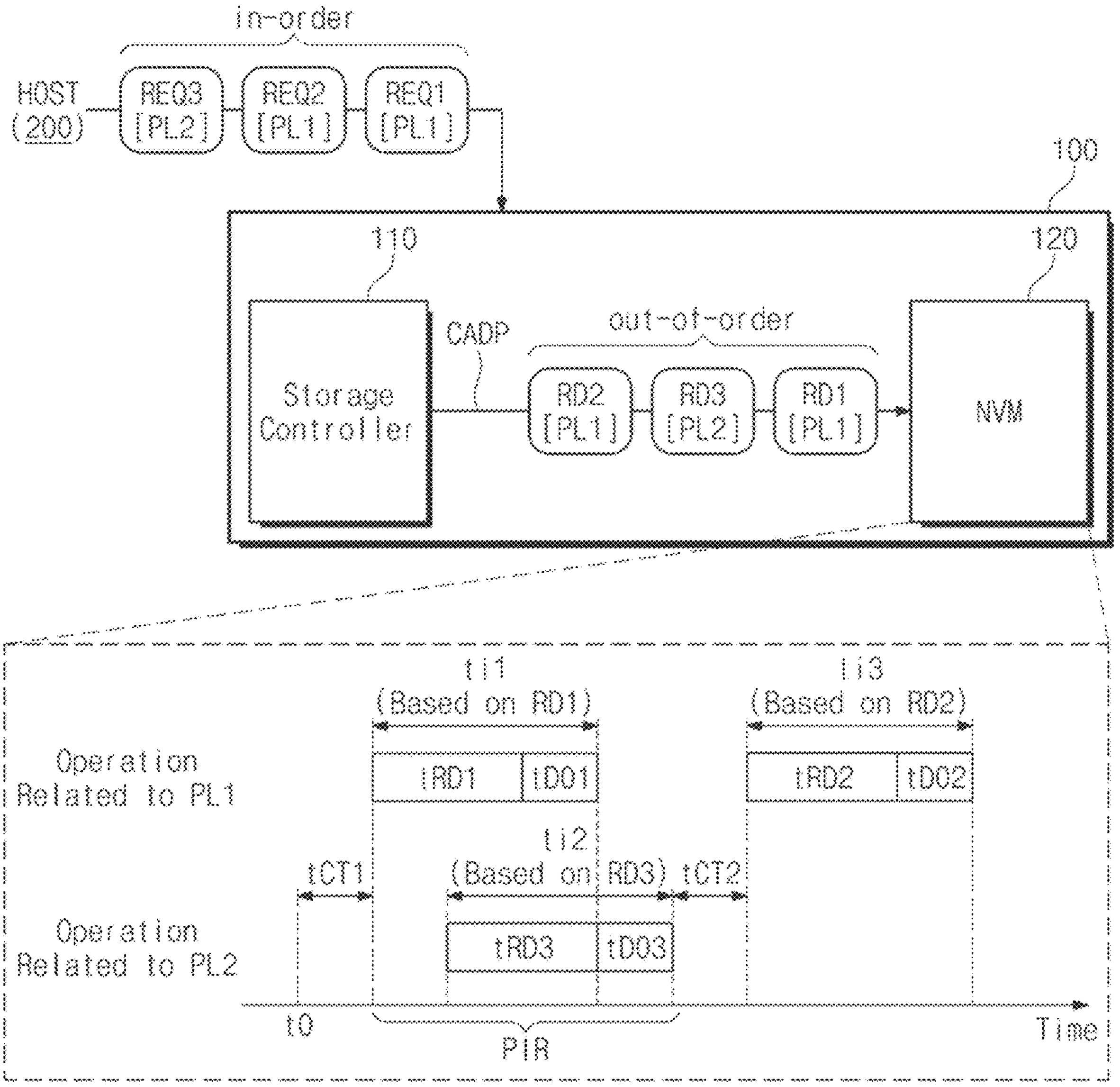
FIG. 4 is a diagram for describing an example of an operation of a storage device of FIG. 1.

FIG. 4 is a diagram for describing an example of an operation of a storage device of FIG. 1. In the example of FIG. 4, the storage controller 110 and the nonvolatile memory device 120 may exchange a command/address and data through a transfer path CADP. Referring to FIG. 4, before a 0-th point in time t0, the storage device 100 may receive first to third requests REQ1 to REQ3 from an external host 200 in order.

For example, before the 0-th point in time t0, the storage controller 110 and the nonvolatile memory device 120 may perform data transmission/reception through the transfer path CADP. Accordingly, before the 0-th point in time t0, the storage controller 110 may fail to send commands corresponding to the first to third requests REQ1 to REQ3 to the nonvolatile memory device 120.

For example, the first request REQ1 may be a request for the first read operation of the first plane PL1, the second request REQ2 may be a request for the second read operation of the first plane PL1, and the third request REQ3 may be a request for the third read operation of the second plane PL2.

The first plane PL1 targeted for the first read operation may be different from the second plane PL2 targeted for the third read operation. Accordingly, the first read operation and the third read operation may be simultaneously performed. The first plane PL1 targeted for the first read operation may be the same as the first plane PL1 targeted for the second read operation. Accordingly, it is impossible to simultaneously perform the first read operation and the second read operation.

The storage controller 110 may generate first to third read commands RD1 to RD3 corresponding to the first to third requests REQ1 to REQ3 in response to the first to third requests REQ1 to REQ3. That is, the first read command RD1 may correspond to the first request REQ1 and may be a command for the first read operation, the second read command RD2 may correspond to the second request REQ2 and may be a command for the second read operation, and the third read command RD3 may correspond to the third request REQ3 and may be a command for the third read operation.

At the 0-th point in time t0, the data transmission/reception between the storage controller 110 and the nonvolatile memory device 120 may be terminated. Accordingly, during a first command transfer period tCT1 from the 0-th point in time t0, the storage controller 110 may send the first read command RD1 to the nonvolatile memory device 120.

Afterwards, during a first time interval ti1, the nonvolatile memory device 120 may perform the first read operation in response to the first read command RD1. The first time interval ti1 may include a first read period tRD1 and a first data output period tDO1. For example, the nonvolatile memory device 120 may read data of the first plane PL1 during the first read period tRD1 and may store the read data in the page buffer 124 (refer to FIG. 2). During the first data output period tDO1, the nonvolatile memory device 120 may output the data stored in the page buffer 124 (refer to FIG. 2) to the storage controller 110 through the transfer path CADP.

The storage controller 110 may check that the first plane PL1 corresponding to the first read operation is different from the second plane PL2 corresponding to the third read operation. Accordingly, the storage controller 110 may determine that the first read operation and the third read operation are capable of being simultaneously performed. In this case, the storage controller 110 may send the third read command RD3 to the nonvolatile memory device 120 while the first read operation is being performed (in other words, before the first read operation is completed). That is, the storage controller 110 may send the first to third read commands RD1 to RD3 in the out-of-order manner.

In this case, during a second time interval ti2, the nonvolatile memory device 120 may perform the third read operation in response to the third read command RD3. The second time interval ti2 may include a third read period tRD3 and a third data output period tDO3. That is, the nonvolatile memory device 120 may perform the first read operation and the third read operation through the PIR operation.

After the second time interval ti2, during a second command transfer period tCT2, the storage controller 110 may send the second read command RD2 to the nonvolatile memory device 120.

Afterwards, during a third time interval ti3, the nonvolatile memory device 120 may perform the second read operation in response to the second read command RD2. The third time interval ti3 may include a second read period tRD2 and a second data output period tDO2.

Unlike the example illustrated in FIG. 4, the storage controller 110 may send the first to third read commands RD1 to RD3 to the nonvolatile memory device 120 in order. In this case, even though the first read operation and the third read operation are capable of being simultaneously performed, the nonvolatile memory device 120 may perform the first read operation and the third read operation in order. In detail, the nonvolatile memory device 120 may complete the first read operation, may complete the second read operation, and may complete the third read operation. In this case, compared to the case where the storage controller 110 transfers commands to the nonvolatile memory device 120 in the out-of-order manner, the performance of the storage controller 110 may be reduced.

As illustrated in FIG. 4, when the storage controller 110 transfers commands in the out-of-order manner, the reduction of performance may be solved. However, in this case, for example, the storage controller 110 should determine whether commands are targeted for the PIR operation (i.e., whether target planes of read commands are different). Accordingly, the storage controller 110 may include a logic circuit for analyzing commands. In this case, as the capacity of the nonvolatile memory device 120 increases, the complexity of the logic circuit of the storage controller 110 may increase. In other words, when an out-of-order operation of the nonvolatile memory device 120 is implemented based on the operation of the storage controller 110, the complexity of the logic circuit of the storage controller 110 may increase.

According to an embodiment of the present disclosure, the nonvolatile memory device 120 may receive commands CMD from the storage controller 110 in order. The nonvolatile memory device 120 may perform operations corresponding to the commands CMD independently of each other and in the out-of-order manner. That is, according to an embodiment of the present disclosure, the storage device 100 may implement the execution of the out-of-order operation of the nonvolatile memory device 120 without increasing the complexity of the logic circuit of the storage device 100.

An operation of the storage device 100 according to an embodiment of the present disclosure will be described in detail with reference to the following drawings.

Figure 5:
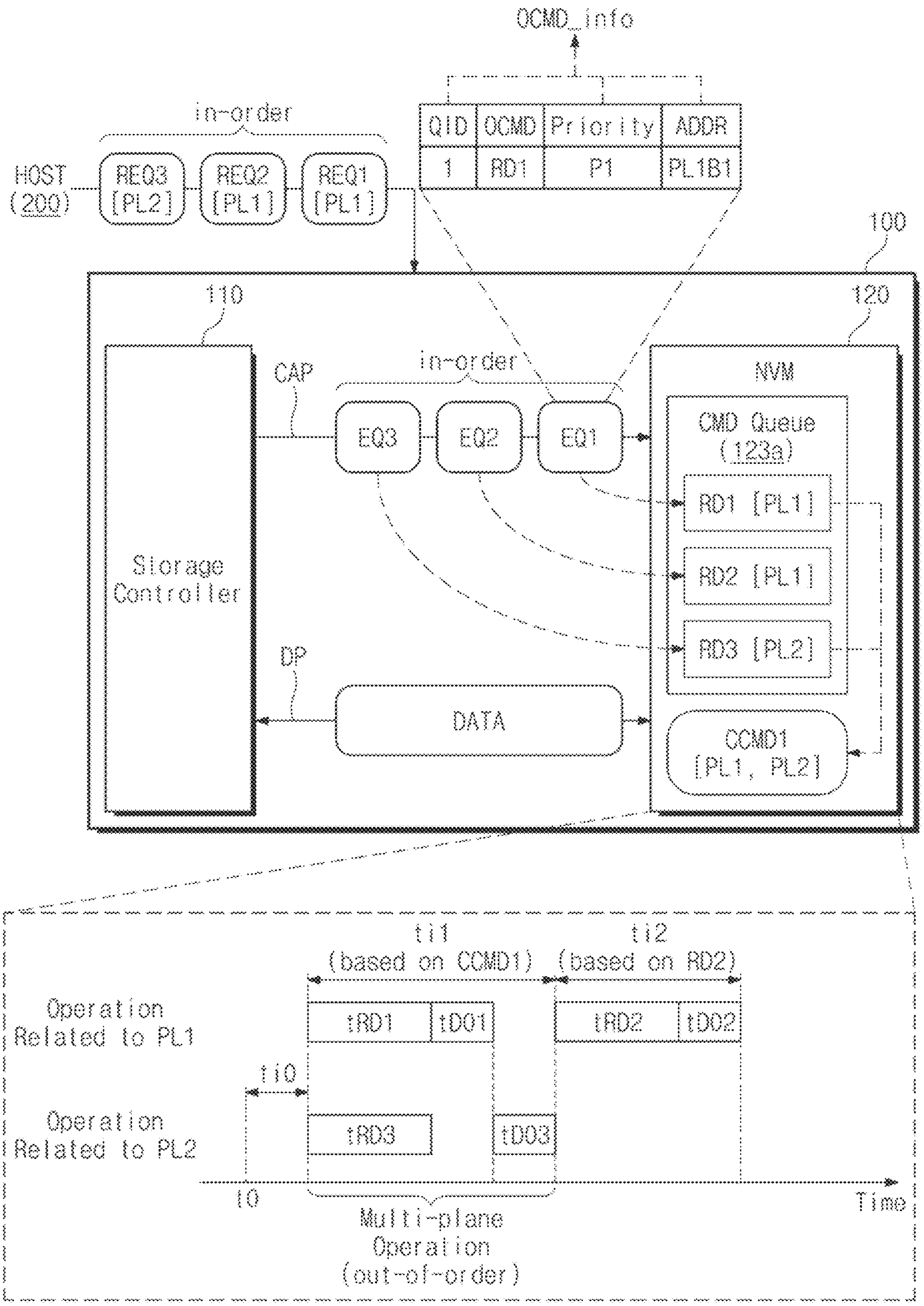
FIG. 5 is a diagram for describing an operation of a storage device of FIG. 1.

FIG. 5 is a diagram for describing an operation of a storage device of FIG. 1. Referring to FIGS. 1 to 3 and 5, the storage controller 110 and the nonvolatile memory device 120 may exchange a command and an address through a first transfer path CAP. The storage controller 110 and the nonvolatile memory device 120 may exchange the data "DATA" through a second transfer path DP.

For example, the first transfer path CAP may be a path passing through the command/address pin. For example, the second transfer path DP may be a path passing through the data input/output pin. The first transfer path CAP and the second transfer path DP or the command/address pin and the data input/output pin may be physically distinguished from each other. In other words, a line (e.g., CAP) through which the storage controller 110 transfers the command/address to the nonvolatile memory device 120 may be distinguished from a line (e.g., DP) through which the storage controller 110 transfers the data "DATA" to the nonvolatile memory device 120. However, the present disclosure is not limited thereto. For example, as illustrated in FIG. 4, the command/address pin and the data input/output pin may be implemented in a structure in which the command/address pin and the data input/output pin are not distinguished from each other.

Returning to FIG. 5, before the 0-th point in time to, the storage device 100 may sequentially receive the first to third requests REQ1 to REQ3 from the external host 200.

Before the 0-th point in time t0, the storage controller 110 and the nonvolatile memory device 120 may exchange the data "DATA" through the second transfer path DP.

For example, the first request REQ1 may be a request for the first read operation of the first plane PL1, the second request REQ2 may be a request for the second read operation of the first plane PL1, and the third request REQ3 may be a request for the third read operation of the second plane PL2.

The storage controller 110 may generate first to third enqueue commands EQ1 to EQ3 corresponding to the first to third requests REQ1 to REQ3 in response to the first to third requests REQ1 to REQ3. For example, the first enqueue command EQ1 may correspond to the first request REQ1 and may be a command for the first read operation, the second enqueue command EQ2 may correspond to the second request REQ2 and may be a command for the second read operation, and the third enqueue command EQ3 may correspond to the third request REQ3 and may be a command for the third read operation.

In an embodiment, an enqueue command (e.g., EQ1 to EQ3) may include an operation command OCMD and operation command information OCMD_info. The nonvolatile memory device 120 may store the operation command OCMD and the operation command information OCMD_info corresponding to the enqueue command (e.g., EQ1, EQ2, or EQ3) in the command queue 123*a* in response to the enqueue command (e.g., EQ1, EQ2, or EQ3) (e.g., this is referred to as "queuing"). In an embodiment, the operation command information OCMD_info may include a processing priority of the operation command OCMD, the address ADDR of the operation command OCMD, and a queue identifier QID.

For example, the first enqueue command EQ1 may include the first read command RD1 being the operation command OCMD and first read command information. For example, the first read command information may include information indicating that the queue identifier QID of the first read command RD1 is "1", the address ADDR is associated with a first block B1 of the first plane PL1 of the nonvolatile memory device 120, and the processing priority is a first priority P1.

As described above, because the path (i.e., the first transfer path CAP) through which the command/address is transferred and the path (i.e., the second transfer path DP) through which the data "DATA" are transferred are distinguished from each other, the storage controller 110 may send the command to the nonvolatile memory device 120 while the transmission/reception of the data "DATA" is being performed. Accordingly, before the 0-th point in time t0, the storage controller 110 may send the first to third enqueue commands EQ1 to EQ3 to the nonvolatile memory device 120.

For example, the nonvolatile memory device 120 may store the first read command RD1 in the command queue 123*a* in response to the first enqueue command EQ1. The nonvolatile memory device 120 may store the second read command RD2 in the command queue 123*a* in response to the second enqueue command EQ2. The nonvolatile memory device 120 may store the third read command RD3 in the command queue 123*a* in response to the third enqueue command EQ3. The first read command RD1 may correspond to the first read operation, the second read command RD2 may correspond to the second read operation, and the third read command RD3 may correspond to the third read operation. That is, the first read command RD1 and the second read command RD2 may be commands for the first plane PL1, and the third read command RD3 may be a command for the second plane PL2.

In other words, the nonvolatile memory device 120 may store the operation commands RD1 to RD3 included in the first to third enqueue commands EQ1 to EQ3 in the command queue 123*a* in order.

At the 0-th point in time t0, the data transmission/reception between the storage controller 110 and the nonvolatile memory device 120 may be terminated.

During a 0-th time interval ti0 from the 0-th point in time t0, the nonvolatile memory device 120 may generate a first combined command CCMD1, based on the first to third read commands RD1 to RD3 stored in the command queue 123*a*. The first combined command CCMD1 may be a command generated by combining the first read command RD1 and the third read command RD3. The first combined command CCMD1 may be a multi-plane command for the first plane PL1 and the second plane PL2. For example, the nonvolatile memory device 120 may combine the first read command RD1 and the third read command RD3 based on that a target plane (i.e., the first plane PL1) of the first read operation is different from a target plane (i.e., the second plane PL2) of the third read operation.

The description is given with reference to FIG. 5 as the nonvolatile memory device 120 generates the first combined command CCMD1 after the transmission/reception of the data "DATA" is terminated, but the present disclosure is not limited thereto. In an embodiment, while the transmission/reception of the data "DATA" is being performed (i.e., before the 0-th point in time t0), the nonvolatile memory device 120 may generate the first combined command CCMD1 based on entries of the command queue 123*a*.

Afterwards, during the first time interval ti1, the nonvolatile memory device 120 may simultaneously perform the first read operation and the third read operation based on the first combined command CCMD1. For example, during the first read period tRD1, the nonvolatile memory device 120 may read data of the first plane PL1 and may store the read data in the page buffer 124 (refer to FIG. 2). Also, during the third read period tRD3, the nonvolatile memory device 120 may read data of the second plane PL2 and may store the read data in the page buffer 124 (refer to FIG. 2). During the first data output period tDO1, the nonvolatile memory device 120 may output the data, which correspond to the first read operation and are stored in the page buffer 124 (refer to FIG. 2), to the storage controller 110 through the second transfer path DP. During the third data output period tDO3, the nonvolatile memory device 120 may output the data, which correspond to the third read operation and are stored in the page buffer 124 (refer to FIG. 2), to the storage controller 110 through the second transfer path DP. That is, the nonvolatile memory device 120 may perform the first read operation and the third read operation in parallel.

Afterwards during the second time interval ti2, the nonvolatile memory device 120 may perform the second read operation based to the second read command RD2. In detail, during the second read period tRD2, the nonvolatile memory device 120 may read data of the second plane PL2 and may store the read data in the page buffer 124 (refer to FIG. 2). During the second data output period tDO2, the nonvolatile memory device 120 may output the data, which correspond to the second read operation and are stored in the page buffer 124 (refer to FIG. 2), to the storage controller 110 through the second transfer path DP.

As described above, the nonvolatile memory device 120 may perform the first and third read operations prior to the second read operation. In other words, the nonvolatile memory device 120 according to an embodiment of the present disclosure may process the operation commands RD1 to RD3 stored in the command queue 123*a* in the out-of-order manner.

According to an embodiment of the present disclosure, the storage controller 110 may send the first to third enqueue commands EQ1 to EQ3 corresponding to the first to third requests REQ1 to REQ3 from the host 200 to the nonvolatile memory device 120 in order.

The nonvolatile memory device 120 may change the order of processing the first to third read commands RD1 to RD3 corresponding to the first to third enqueue commands EQ1 to EQ3 regardless of the order of receiving the first to third enqueue commands EQ1 to EQ3 and may combine the first to third read commands RD1 to RD3. That is, the nonvolatile memory device 120 may perform operations corresponding to commands sequentially received from the storage controller 110 in the out-of-order manner. Accordingly, the performance of the storage device 100 may be improved without increasing the complexity of the logic circuit of the storage controller 110.

Also, according to an embodiment of the present disclosure, a transfer path (i.e., the first transfer path CAP) to which the command/address is transferred between the storage controller 110 and the nonvolatile memory device 120 may be distinguished from a transfer path (i.e., the second transfer path DP) through which the data "DATA" are transferred/received between the storage controller 110 and the nonvolatile memory device 120. Accordingly, the storage controller 110 may send the first to third enqueue commands EQ1 to EQ3 to the nonvolatile memory device 120 while data are being exchanged through the second transfer path DP. That is, according to the present disclosure, unlike the case of FIG. 4, after the transmission/reception of the data "DATA" is terminated, read commands may not be transferred separately (i.e., after the transmission/reception of the data "DATA" is terminated, the command transfer periods tCT1 and tCT1 are not separately required). Accordingly, the storage device 100 may operate at high speed.

Unlike the example illustrated in FIG. 5, in an embodiment, it may be necessary to process the first to third requests REQ1 to REQ3 in the order of receiving the first to third requests REQ1 to REQ3 from the host 200. In this case, the storage controller 110 may not generate the first to third enqueue commands EQ1 to EQ3. The storage controller 110 may send the first to third read commands RD1 to RD3 to the nonvolatile memory device 120 instead of the first to third enqueue commands EQ1 to EQ3. In this case, the nonvolatile memory device 120 may process the first to third read commands RD1 to RD3 depending on the order of receiving the first to third read commands RD1 to RD3.

Figure 6:
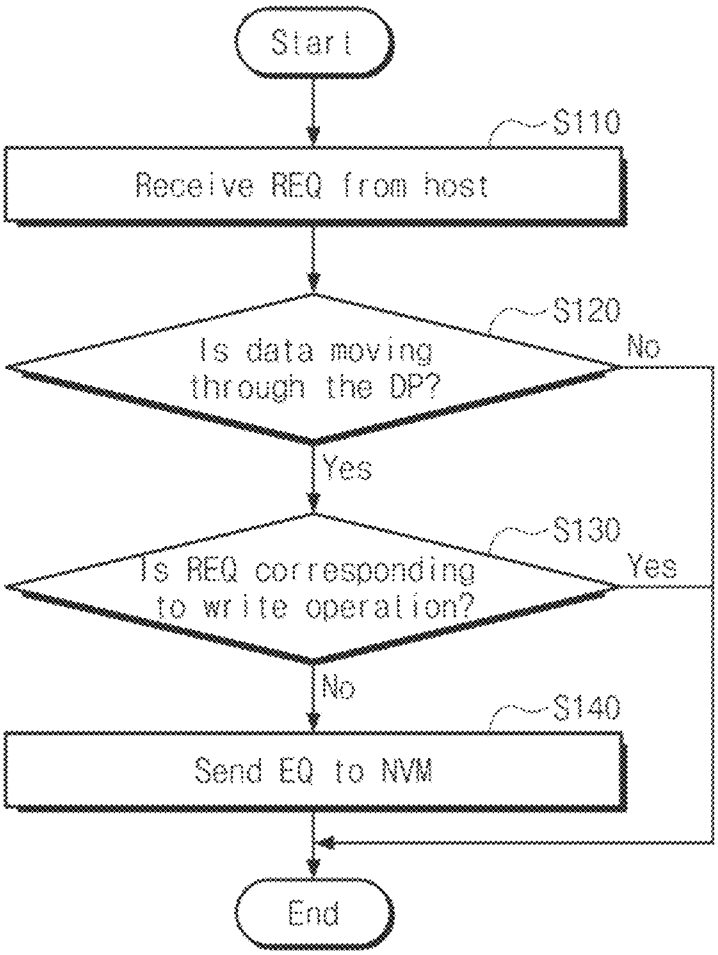
FIG. 6 is a flowchart for describing an example of an operating method of a storage controller of FIG. 5.

FIG. 6 is a flowchart for describing an example of an operating method of a storage controller of FIG. 5. In detail, FIG. 6 is a flowchart for describing an example of an operation in which the storage controller 110 generates enqueue commands (e.g., EQ1 to EQ3). Referring to FIGS. 5 and 6, in operation S110, the storage controller 110 may receive a request REQ from the external host 200.

In operation S120, the storage controller 110 may determine whether data are being transferred through the second transfer path DP (i.e., whether data transmission/reception is being performed). When the data are being transferred through the second transfer path DP, the storage controller 110 may perform operation S130. When the data are not transferred through the second transfer path DP, the storage controller 110 may not generate the enqueue command EQ. In other words, when data are not transferred through the second transfer path DP, the storage controller 110 may not send an enqueue command EQ to the nonvolatile memory device 120.

In an embodiment, when data are not transferred through the second transfer path DP, the storage controller 110 may send not the enqueue command EQ but an operation command (e.g., a write command, a read command, or an erase command) to the nonvolatile memory device 120.

In operation S130, the storage controller 110 may determine whether the request REQ from the host 200 corresponds to the write operation. When the request REQ corresponds to the write operation, the storage controller 110 may not send the enqueue command (e.g., EQ1, EQ2, or EQ3). When the request REQ does not correspond to the write operation, in operation S140, the storage controller 110 may send the enqueue command EQ to the nonvolatile memory device 120.

In an embodiment, when the request REQ from the host 200 corresponds to the write operation, the storage controller 110 may send write data and the write command to the nonvolatile memory device 120 after the data transmission through the second transfer path DP is terminated.

An example in which the storage controller 110 is capable of transferring an enqueue command (e.g., EQ1, EQ2, or EQ3) to the nonvolatile memory device 120 only when data are being transferred through the second transfer path DP is illustrated in FIG. 6, but the present disclosure is not limited thereto. That is, in another embodiment, even though the data are not transferred through the second transfer path DP, the storage controller 110 may send an enqueue command (e.g., EQ1, EQ2, or EQ3) to the nonvolatile memory device 120.

Figures 7A, 7B:
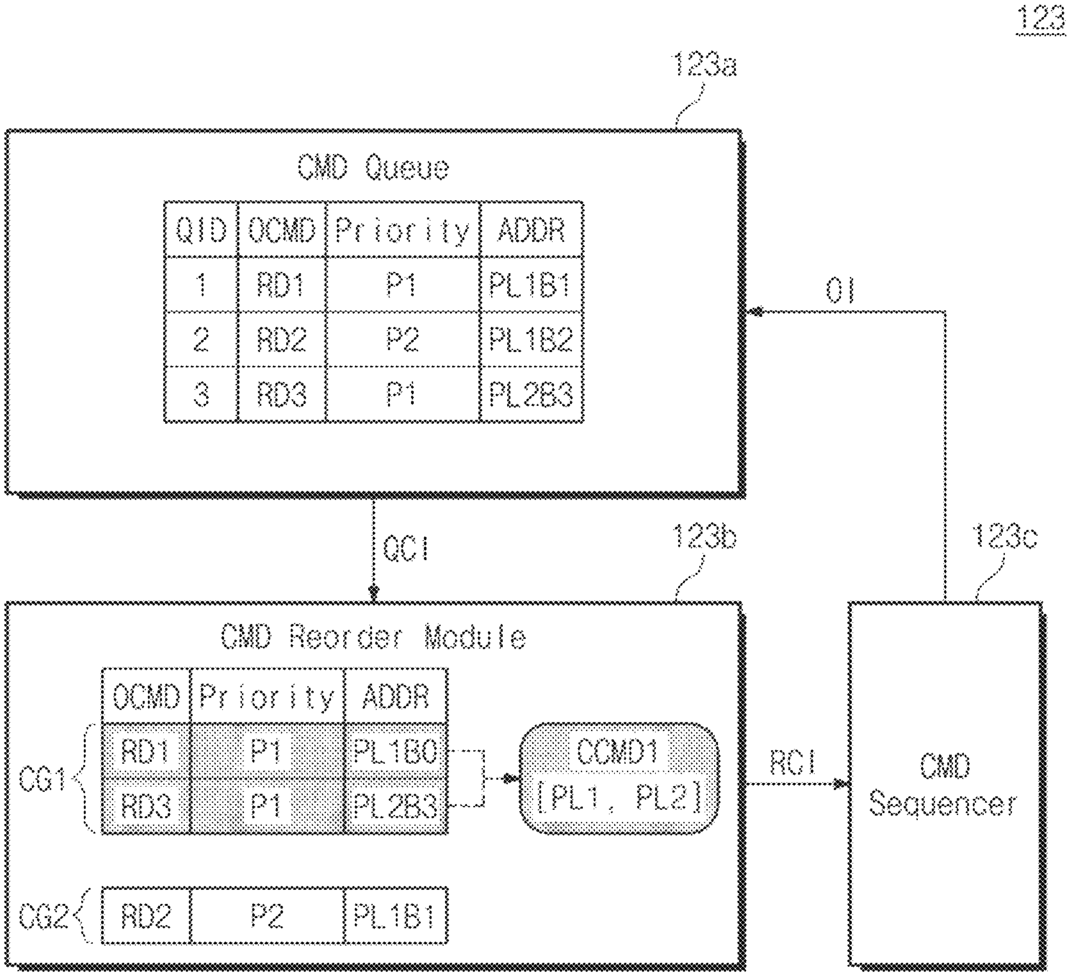
FIGS. 7A and 7B are block diagrams for describing an operation of a nonvolatile memory device of FIG. 5.

FIGS. 7A and 7B are block diagrams for describing an operation of a nonvolatile memory device of FIG. 5. FIGS. 7A and 7B will be described with reference to FIGS. 1 to 3, 5, and 6. Referring to FIG. 7A, the control logic 123 of the nonvolatile memory device 120 may include the command queue 123*a*, the command reorder module 123*b*, and a command sequencer 123*c*.

As described with reference to FIG. 5, the command queue 123*a* may store the operation commands OCMD and operation command information (e.g., OCMD_info of FIG. 1) included in the first to third enqueue commands EQ1 to EQ3 from the storage controller 110.

For example, the first read command RD1 may be included in the first enqueue command EQ1, the second read command RD2 may be included in the second enqueue command EQ2, and the third read command RD3 may be included in the third enqueue command EQ3.

For example, the first read command RD1 may be a command which has the first priority P1 and is associated with the first block B1 of the first plane PL1. For example, the second read command RD2 may be a command which has a second priority P2 and is associated with a second block B2 of the first plane PL1. For example, the third read command RD3 may be a command which has the first priority P1 and is associated with a third block B3 of the second plane PL2. For example, the first priority P1 may be higher in processing priority than the second priority P2.

In an embodiment, the command queue 123*a* may be implemented in a first-in first-out (FIFO) queue type.

In an embodiment, the command queue 123*a* may be implemented in a circular queue type indicating a start and an end of a command line stored in a queue through a head pointer and a tail pointer, respectively. However, the present disclosure is not limited thereto. For example, the command queue 123*a* may be implemented in various types.

In an embodiment, unlike the example illustrated in FIG. 7A, the command queue 123*a* may include a plurality of sub-queues corresponding to priorities. In detail, for example, the command queue 123*a* may include a first sub-queue and a second sub-queue. The first sub-queue may correspond to the first priority P1, and the second sub-queue may correspond to the second priority P2. In an embodiment, the control logic 123 may store the operation commands OCMD (e.g., RD1 and RD3) having the first priority P1 in the first sub-queue and may store the operation command OCMD (e.g., RD2) having the second priority P2 in the second sub-queue.

For example, the command reorder module 123*b* may generate a combined command by combining the operation commands OCMD capable of being simultaneously processed. The command reorder module 123*b* may receive queue command information QCI from the command queue 123*a*. For example, the queue command information QCI may include the operation commands OCMD and the pieces of operation command information (e.g., OCMD_info of FIG. 1) stored in the command queue 123*a*. The command reorder module 123*b* may determine the order of processing the operation commands OCMD, based on the queue command information QCI. Also, the command reorder module 123*b* may combine the operation commands OCMD based on the queue command information QCI. For example, the command reorder module 123*b* may combine the operation commands OCMD to generate the first combined command CCMD1. That is, the command reorder module 123*b* may reorder the operation commands OCMD based on the queue command information QCI.

The command reorder module 123*b* may classify the operation commands OCMD, based on a command kind of the operation command OCMD (i.e., whether the operation command OCMD indicates the read operation or the erase operation), the processing priority of the operation command OCMD, and a plane corresponding to the operation command OCMD.

For example, a plane (i.e., the first plane PL1) corresponding to the first read command RD1 may be different from a plane (i.e., the second plane PL2) corresponding to the third read command RD3. Also, the first read command RD1 and the third read command RD3 may have the same processing priority, that is, the first priority P1. That is, the first read command RD1 and the third read command RD3 may be capable of being simultaneously processed.

A plane corresponding to the second read command RD2 may be identical to the plane (i.e., the first plane PL1) corresponding to the first read command RD1. Also, the second read command RD2 may be lower in processing priority than the third read command RD3 (i.e., may have the second priority P2). Accordingly, the second read command RD2 may be incapable of being simultaneously processed with the first read command RD1 or the third read command RD3.

For example, the command reorder module 123*b* may group the first read command RD1 and the third read command RD3 into a first command group CG1 and may group the second read command RD2 into a second command group CG2. The command reorder module 123*b* may generate the first combined command CCMD1 by combining the first read command RD1 and the third read command RD3 belonging to the first command group CG1. The first combined command CCMD1 may be the multi-plane read command for the first plane PL1 and the second plane PL2.

That is, when one command group (e.g., CG1) includes two or more commands (e.g., RD1 and RD3), the command reorder module 123*b* may generate a combined command (e.g., CCMD1) by combining the commands (e.g., RD1 and RD3) included in the command group (e.g., CG1).

The command reorder module 123*b* may determine the order of processing the first combined command CCMD1 and the second read command RD2 based on the processing priorities of the first to third read commands RD1 to RD3. For example, the first priority P1 of the read commands RD1 and RD3 which are used to generate the first combined command CCMD1 may be higher than the second priority P2 of the second read command RD2. Accordingly, the command reorder module 123*b* may determine processing priorities of the first combined command CCMD1 and the second read command RD2 such that the first combined command CCMD1 is processed prior to the second read command RD2.

The command reorder module 123*b* may send reordering command information RCI to the command sequencer 123*c*. Referring to FIG. 7B, for example, the reordering command information RCI may include a processing order of the first combined command CCMD1 and the second read command RD2, addresses ADDR corresponding to the first combined command CCMD1 and the second read command RD2, and information about command kinds of the first combined command CCMD1 and the second read command RD2. However, the present disclosure is not limited thereto.

The command sequencer 123*c* may control the nonvolatile memory device 120 (refer to FIG. 1), based on the reordering command information RCI. The command sequencer 123*c* may simultaneously perform the first and third read operations on the memory cell array 121 (refer to FIG. 1) based on the first combined command CCMD1. After the first and third read operations are terminated, the command sequencer 123*c* may perform the second read operation based on the second read command RD2.

In other words, the nonvolatile memory device 120 according to an embodiment of the present disclosure may independently generate the combined command (e.g., CCMD1) to perform the multi-plane operation. Also, the nonvolatile memory device 120 may determine the order of processing commands, based on the processing priorities of the operation commands OCMD. That is, the nonvolatile memory device 120 may process command in the out-of-order manner. Accordingly, the performance of the storage device 100 may be improved.

For example, after the operation based on the reordering command information RCI is terminated, the command sequencer 123*c* may send operation execution information OI to the command queue 123*a*. For example, the operation execution information OI may include information about a situation where operations corresponding to commands (e.g., CCMD1 and RD2) are performed. For example, the command queue 123*a* may determine whether the first to third read operations are completed or are being performed, based on the operation execution information OI.

Figure 8:
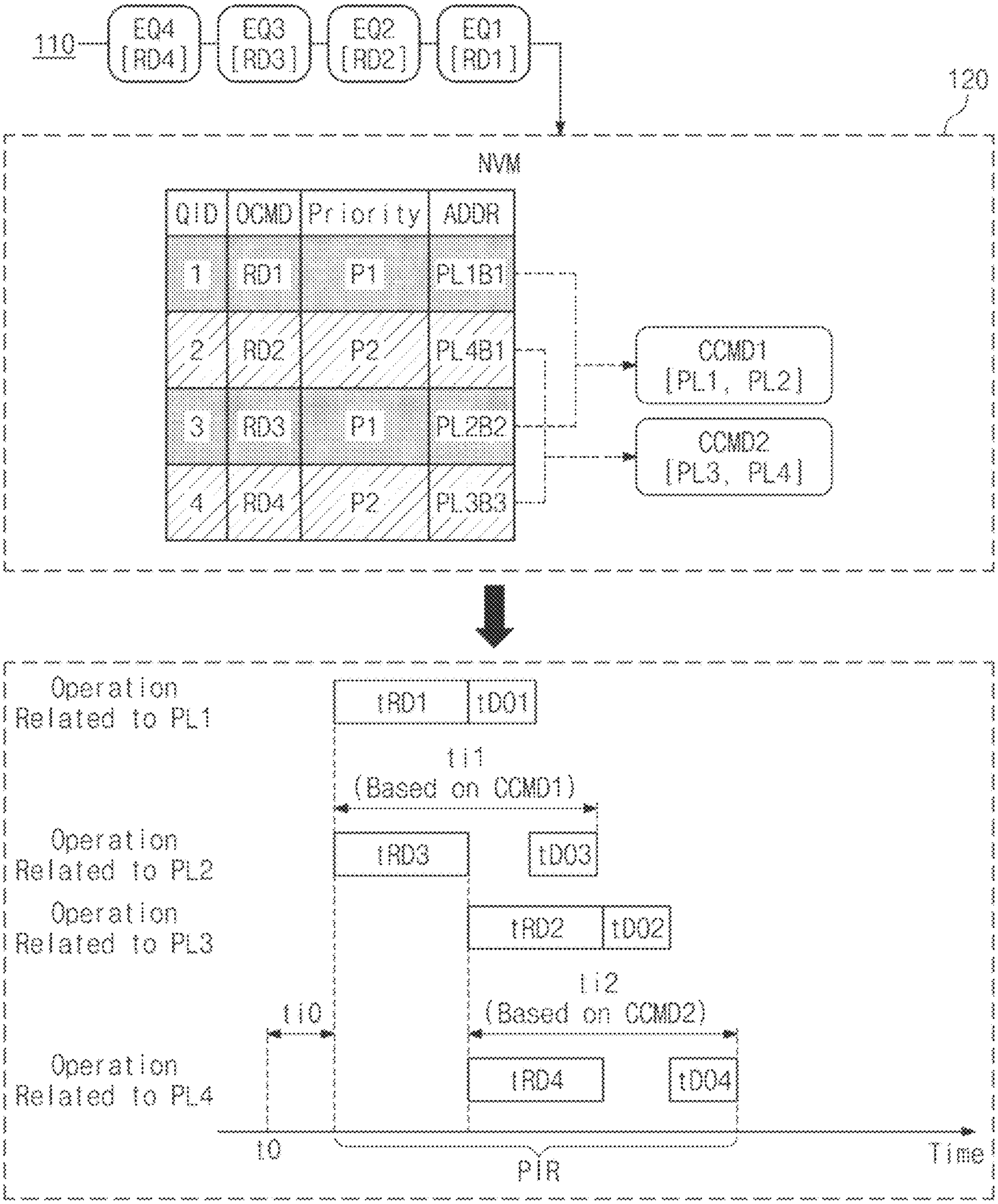
FIG. 8 is a diagram for describing another example of an operation of a storage device of FIG. 1.

FIG. 8 is a diagram for describing another example of an operation of a storage device of FIG. 1. FIG. 8 will be described with reference to FIGS. 1 to 3 and 5 to 7. Referring to FIG. 8, before the 0-th point in time to, the storage controller 110 may send first to fourth enqueue commands EQ1 to EQ4 to the nonvolatile memory device 120 in response to requests from the host 200 (refer to FIG. 5). Before the 0-th point in time t0, the storage controller 110 and the nonvolatile memory device 120 may exchange the data "DATA" through the second transfer path DP (refer to FIG. 5).

For example, the first enqueue command EQ1 may include the first read command RD1, the second enqueue command EQ2 may include the second read command RD2, the third enqueue command EQ3 may include the third read command RD3, and the fourth enqueue command EQ4 may include a fourth read command RD4. The first read command RD1 may be a command which has the first priority P1 and is associated with the first block B1 of the first plane PL1, the second read command RD2 may be a command which has the second priority P2 and is associated with a first block B1 of the fourth plane PL4, the third read command RD3 may be a command which has the first priority P1 and is associated with the second block B2 of the second plane PL2, and the fourth read command RD4 may be a command which has the second priority P2 and is associated with a third block B3 of the third plane PL3.

For example, the first priority P1 may be higher in processing priority than the second priority P2.

The nonvolatile memory device 120 may store the first to fourth read commands RD1 to RD4 and first to fourth read command information (e.g., including the priority, the address ADDR, and the queue identifier QID of each of the first to fourth read commands RD1 to RD4) in the command queue 123*a* (refer to FIG. 1) in order, in response to the first to fourth enqueue commands EQ1 to EQ4.

For example, at the 0-th point in time t0, the storage controller 110 (refer to FIG. 5) and the nonvolatile memory device 120 may complete the transmission/reception of the data "DATA".

For example, during the 0-th time interval ti0 from the 0-th point in time to, the nonvolatile memory device 120 may generate the first combined command CCMD1 and a second combined command CCMD2. In detail, the command reorder module 123*b* (refer to FIG. 1) of the nonvolatile memory device 120 may generate the first combined command CCMD1 and the second combined command CCMD2 based on the first to fourth read commands RD1 to RD4 stored in the command queue 123*a* (refer to FIG. 1).

The nonvolatile memory device 120 may generate the first combined command CCMD1 by combining the first read command RD1 and the third read command RD3. In detail, the nonvolatile memory device 120 may combine the first read command RD1 and the third read command RD3 based on that the first plane PL1 corresponding to the first read command RD1 and the second plane PL2 corresponding to the third read command RD3 are different from each other and the first read command RD1 and the third read command RD3 have the same processing priority, that is, the first priority P1. That is, the first combined command CCMD1 may be the multi-plane command for the first plane PL1 and the second plane PL2.

The nonvolatile memory device 120 may generate the second combined command CCMD2 by combining the second read command RD2 and the fourth read command RD4. In detail, the nonvolatile memory device 120 may combine the second read command RD2 and the fourth read command RD4 based on that the fourth plane PLA corresponding to the second read command RD2 and the third plane PL3 corresponding to the fourth read command RD4 are different from each other and the second read command RD2 and the fourth read command RD4 have the same processing priority, that is, the second priority P2. The second combined command CCMD2 may be the multi-plane command for the second plane PL2 and the fourth plane PL4.

The processing priority P1 of the commands RD1 and RD3 constituting the first combined command CCMD1 may be higher than the processing priority P2 of the commands RD2 and RD4 constituting the second combined command CCMD2. Accordingly, the nonvolatile memory device 120 may determine the processing priority of the first combined command CCMD1 is higher than the processing priority of the second combined command CCMD2. In this case, the nonvolatile memory device 120 may process the first combined command CCMD1 prior to the second combined command CCMD2.

In detail, during the first time interval ti1, the nonvolatile memory device 120 may perform the first read operation and the third read operation based on the first combined command CCMD1. For example, during the first read period tRD1, the nonvolatile memory device 120 may read data of the first plane PL1 and may store the read data in the page buffer 124 (refer to FIG. 2). Also, during the third read period tRD3, the nonvolatile memory device 120 may read data of the second plane PL2 and may store the read data in the page buffer 124 (refer to FIG. 2). During the first data output period tDO1, the nonvolatile memory device 120 may output the data, which correspond to the first read operation and are stored in the page buffer 124 (refer to FIG. 2), to the storage controller 110. During the third data output period tDO3, the nonvolatile memory device 120 may output the data, which correspond to the third read operation and are stored in the page buffer 124 (refer to FIG. 2), to the storage controller 110. That is, during the first time interval ti1, the nonvolatile memory device 120 may perform the first read operation and the third read operation in parallel.

The planes PL1 and PL2 corresponding to the first combined command CCMD1 may not include any one of the planes PL3 and PL4 corresponding to the second combined command CCMD2. Accordingly, the nonvolatile memory device 120 may start the execution of the second read operation and the fourth read operation based on the second combined command CCMD2 while performing the first read operation and the third read operation based on the first combined command CCMD1. In other words, the nonvolatile memory device 120 may perform the PIR operation based on the first combined command CCMD1 and the second combined command CCMD2.

In detail, during the second time interval ti2, the nonvolatile memory device 120 may perform the second read operation and the fourth read operation based on the second combined command CCMD2. For example, during the second read period tRD2, the nonvolatile memory device 120 may read data of the third plane PL3 and may store the read data in the page buffer 124 (refer to FIG. 2). Also, during a fourth read period tRD4, the nonvolatile memory device 120 may read data of the fourth plane PL4 and may store the read data in the page buffer 124 (refer to FIG. 2). During the second data output period tDO2, the nonvolatile memory device 120 may output the data, which correspond to the second read operation and are stored in the page buffer 124 (refer to FIG. 2), to the storage controller 110. During a fourth data output period tDO4, the nonvolatile memory device 120 may output the data, which correspond to the fourth read operation and are stored in the page buffer 124 (refer to FIG. 2), to the storage controller 110. That is, during the second time interval ti2, the nonvolatile memory device 120 may perform the second read operation and the fourth read operation in parallel.

That is, according to an embodiment of the present disclosure, even though the planes PL1 to PL4 corresponding to the operation commands RD1 to RD4 are different from each other, processing priorities (e.g., P1 and P2) of the operation commands RD1 to RD4 may not be identical to each other. In this case, the nonvolatile memory device 120 may fail to generate one combined command by combining all the operation commands RD1 to RD4. However, the nonvolatile memory device 120 may generate a plurality of combined commands CCMD1 and CCMD2 by combining commands having the same processing priority from among the operation commands RD1 to RD4. Also, the nonvolatile memory device 120 may process the plurality of combined commands CCMD1 and CCMD2 through the PIR operation.

Figure 9:
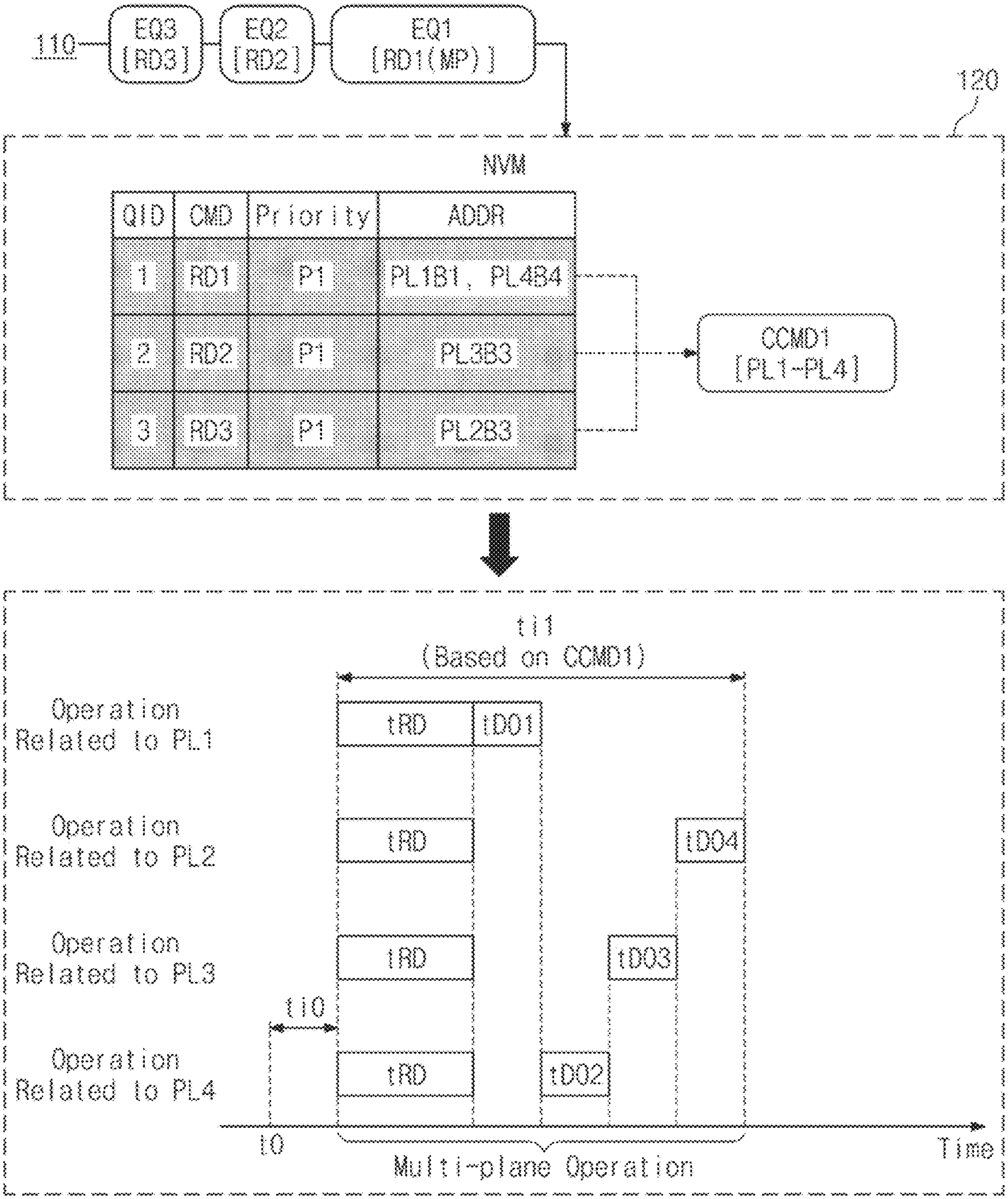
FIG. 9 is a diagram for describing another example of an operation of a storage device of FIG. 1.

FIG. 9 is a diagram for describing another example of an operation of a storage device of FIG. 1. FIG. 9 will be described with reference to FIGS. 1 to 3 and 5 to 8. Referring to FIG. 9, before the 0-th point in time t0, the storage controller 110 may send the first to third enqueue commands EQ1 to EQ3 to the nonvolatile memory device 120 in response to requests from the host 200 (refer to FIG. 5). For example, before the 0-th point in time to, the storage controller 110 (refer to FIG. 5) and the nonvolatile memory device 120 may exchange the data "DATA" through the second transfer path DP (refer to FIG. 5).

For example, the first enqueue command EQ1 may include the first read command RD1, the second enqueue command EQ2 may include the second read command RD2, and the third enqueue command EQ3 may include the third read command RD3. The first read command RD1 may be a command which has the first priority P1 and is associated with the first block B1 of the first plane PL1 and the fourth block B4 of the fourth plane PL4. That is, the first read command RD1 may be a multi-plane command MP. The second read command RD2 may be a command which has the first priority P1 and is associated with the third block B3 of the third plane PL3, and the third read command RD3 may be a command which has the first priority P1 and is associated with the third block B3 of the second plane PL2.

For example, at the 0-th point in time t0, the storage controller 110 (refer to FIG. 5) and the nonvolatile memory device 120 may complete the transmission/reception of the data "DATA".

For example, during the 0-th time interval ti0 from the 0-th point in time to, the nonvolatile memory device 120 may generate the first combined command CCMD1. The planes PL1 and PL4 corresponding to the first read command RD1 may be different from the plane PL3 corresponding to the second read command RD2 and the plane P2 corresponding to the third read command RD3. Also, the first to third read commands RD1 to RD3 may have the same processing priority, that is, the first priority P1. Accordingly, the nonvolatile memory device 120 may generate the first combined command CCMD1 by combining the first to third read commands RD1 to RD3. In this case, the first combined command CCMD1 may be the multi-plane command for the first to fourth planes PL1 to PL4.

During the first time interval ti1, the nonvolatile memory device 120 may simultaneously perform the first to fourth read operations based on the first combined command CCMD1. For example, the first read operation may be a read operation on the first plane PL1 corresponding to the first read command RD1, and the second read operation may be a read operation on the fourth plane PL4 corresponding to the first read command RD1. Additionally, the third read operation may be a read operation on the third plane PL3 corresponding to the second read command RD2, and the fourth read operation may be a read operation on the second plane PL2 corresponding to the third read command RD3. In detail, during the read period tRD, the nonvolatile memory device 120 may read data of the first to fourth planes PL1 to PL4 and may store the read data in the page buffer 124 (refer to FIG. 2). During the first data output period tDO1, the nonvolatile memory device 120 may output the data of the first plane PL1, which correspond to the first read operation and are stored in the page buffer 124 (refer to FIG. 2), to the storage controller 110. During the second data output period tDO2, the nonvolatile memory device 120 may output the data of the fourth plane PL4, which correspond to the second read operation and are stored in the page buffer 124 (refer to FIG. 2), to the storage controller 110. During the third data output period tDO3, the nonvolatile memory device 120 may output the data of the third plane PL3, which correspond to the third read operation and are stored in the page buffer 124 (refer to FIG. 3), to the storage controller 110. During the fourth data output period tDO4, the nonvolatile memory device 120 may output the data of the second plane PL2, which correspond to the fourth read operation and are stored in the page buffer 124 (refer to FIG. 2), to the storage controller 110.

That is, the nonvolatile memory device 120 according to an embodiment of the present disclosure may generate a combined command (e.g., CCMD1) by combining a multi-plane command (e.g., RD1) and single plane commands (e.g., RD2 and RD3) from the storage controller 110.

Figure 10:
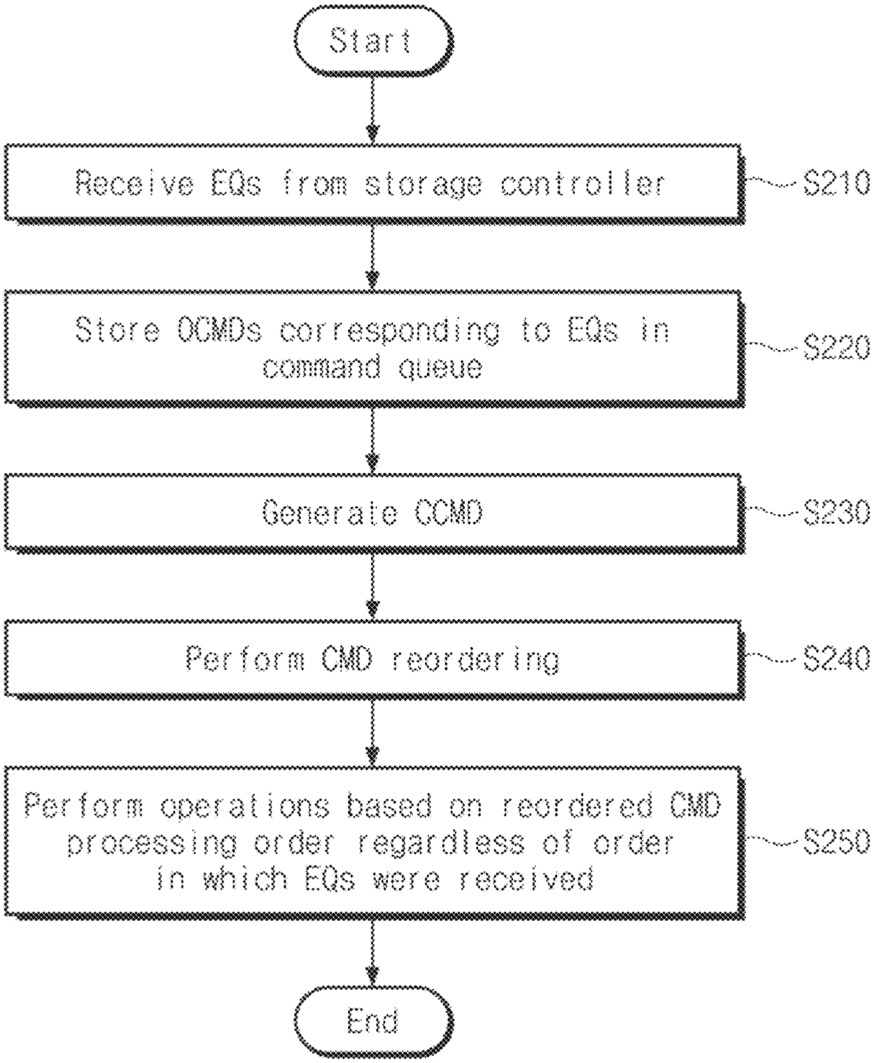
FIG. 10 is a flowchart for describing an operating method of a nonvolatile memory device of FIG. 1.

FIG. 10 is a flowchart for describing an operating method of a nonvolatile memory device of FIG. 1. FIG. 10 will be described with reference to FIGS. 1 to 3 and 5 to 9. Referring to FIG. 10, in operation S210, the nonvolatile memory device 120 may receive enqueue commands EQs from the storage controller 110. In operation S220, the nonvolatile memory device 120 may store the operation commands OCMD corresponding to the enqueue commands EQs in the command queue 123*a* (refer to FIG. 1) (e.g., this is referred to as "queuing").

In operation S230, the nonvolatile memory device 120 may generate a combined command CCMD. In detail, the nonvolatile memory device 120 may generate the combined command CCMD based on the operation commands OCMD stored in the command queue 123*a* (refer to FIG. 1). The combined command CCMD may be the multi-plane command.

In operation S240, the nonvolatile memory device 240 may perform command reordering. For example, the nonvolatile memory device 120 may determine the order of processing the combined commands CCMD and the operation commands OCMD. For example, the nonvolatile memory device 120 may determine a processing order based on the priority of each of the combined commands CCMD and the operation commands OCMD.

In operation S250, the nonvolatile memory device 120 may perform operations corresponding to the operation commands OCMD regardless of the order of receiving the enqueue commands EQs. In detail, the nonvolatile memory device 120 may perform operations respectively corresponding to the combined commands CCMD and the operation commands OCMD based on the order of processing the reordered commands.

Figure 11:
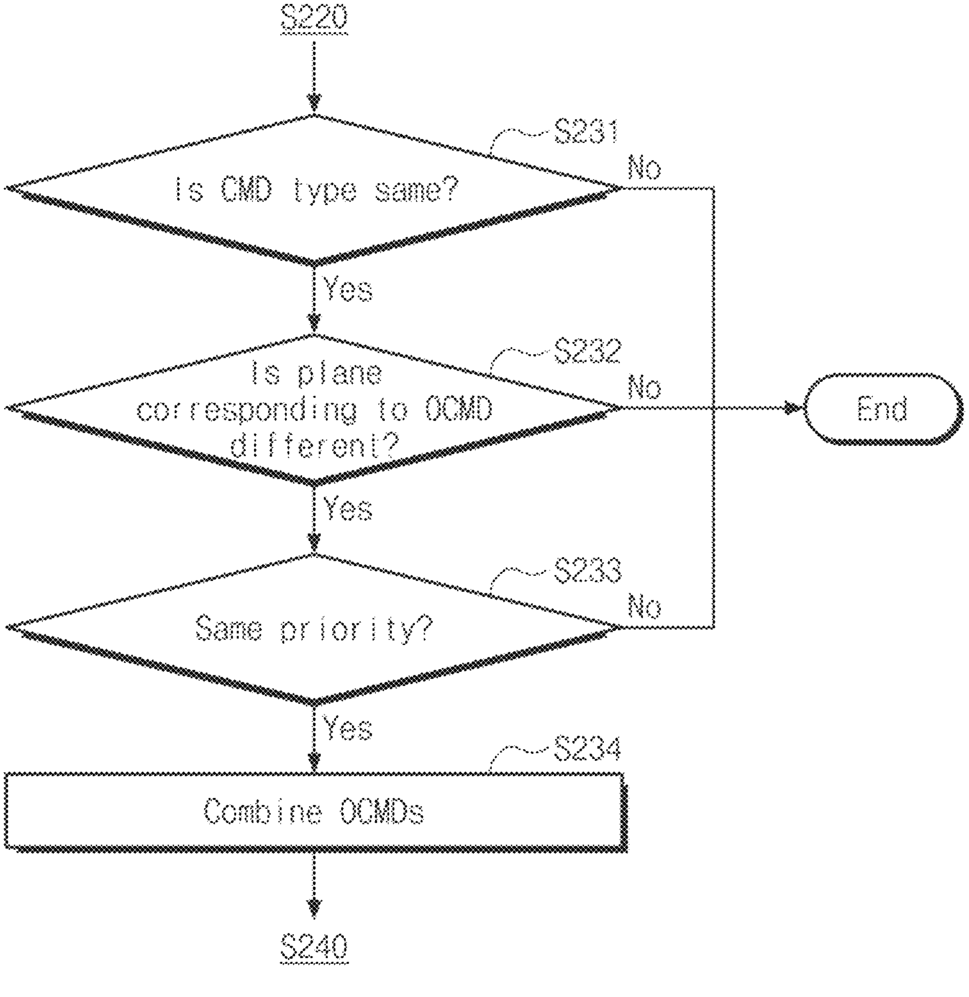
FIG. 11 is a flowchart for describing operation S230 of FIG. 10 in detail.

FIG. 11 is a flowchart for describing operation S230 of FIG. 10 in detail. Referring to FIG. 11, in operation S231, the nonvolatile memory device 120 may determine whether the operation commands OCMD is of the same command type. For example, the command type may indicate the read operation, the erase operation, etc. The nonvolatile memory device 120 may not generate the combined command CCMD based on the operation commands OCMD with different command types. When the operation commands OCMD is of the same command type, the nonvolatile memory device 120 may perform operation S232.

In operation S232, the nonvolatile memory device 120 may determine whether planes corresponding to the operation commands OCMD are different from each other. For example, the operation commands OCMD may be associated with the same plane. In this case, the nonvolatile memory device 120 may not generate the combined command CCMD based on the operation commands OCMD. For example, the operation commands OCMD may correspond to different planes. In this case, the nonvolatile memory device 120 may perform operation S233.

In operation S233, the nonvolatile memory device 120 may determine whether the operation commands OCMD are of the same processing priority. For example, the processing priorities of the operation commands OCMD may be different from each other. In this case, the nonvolatile memory device 120 may not generate the combined command CCMD. For example, the operation commands OCMD may be of the same processing priority. In this case, the nonvolatile memory device 120 may perform operation S234.

In operation S234, the nonvolatile memory device 120 may combine the combined commands CCMD. In other words, the nonvolatile memory device 120 may generate the combined command CCMD by combining the operation commands OCMD, which are of the same command type, respectively correspond to different planes, and are of the same processing priority, from among the operation commands OCMD of the command queue 123*a* (refer to FIG. 1).

Figure 12:
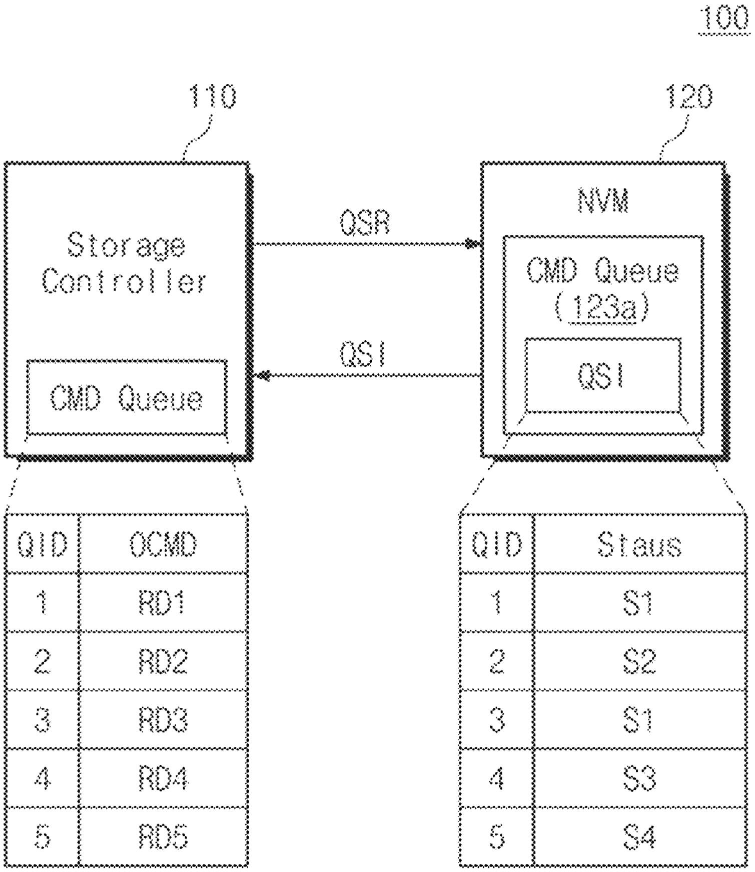
FIG. 12 is a diagram for describing another example of an operation of a storage device of FIG. 1.

FIG. 12 is a diagram for describing another example of an operation of a storage device of FIG. 1. FIG. 12 will be described with reference to FIGS. 1 to 3 and 5 to 11. As described above, even though commands are received from the storage controller 110 in order, the nonvolatile memory device 120 according to an embodiment of the present disclosure may perform operations corresponding to the commands in the out-of-order manner.

Accordingly, the storage controller 110 may fail to know whether an operation being currently performed in the nonvolatile memory device 120 is an operation corresponding to any command. For this reason, to check the processing status of the command(s) transmitted to the nonvolatile memory device 120, the storage controller 110 may send a queue status read command QSR to the nonvolatile memory device 120.

In an embodiment, the storage controller 110 may include queue identifier information QID_info. For example, the queue identifier information QID_info may include information about the queue identifier QID corresponding to the operation command OCMD transmitted to the nonvolatile memory device 120. For example, the queue identifier information QID_info may include information indicating that the queue identifier QID of the first read command RD1 is “1”, the queue identifier QID of the second read command RD2 is “2”, the queue identifier QID of the third read command RD3 is “3”, the queue identifier QID of the fourth read command RD4 is “4”, and the queue identifier QID of a fifth read command RD5 is “5”.

The nonvolatile memory device 120 may send queue status information QSI stored in the command queue 123*a* to the storage controller 110 in response to the queue status read command QSR. For example, the queue status information QSI may include information about the queue identifier QID and the processing status of the operation command corresponding to the queue identifier QID.

In an embodiment, the processing status may correspond to one of a first state S1 to a fourth state S4. The first state S1 may indicate a processing standby state. The second state S2 may indicate that the operation command is under processing. The third state S3 may indicate that the operation command is completely processed. The fourth state S4 may indicate a processing failure state.

In an embodiment, like the example of FIG. 8, the nonvolatile memory device 120 may generate the first combined command CCMD1 (refer to FIG. 8) by combining the first read command RD1 and the third read command RD3. For example, the nonvolatile memory device 120 may wait for the processing of the first combined command CCMD1 (refer to FIG. 8). In this case, in the queue status information QSI, the processing status corresponding to each of the queue identifier QID of “1” and the queue identifier QID of “3” may correspond to the first state S1.

The storage controller 110 may check the execution status of the operation commands OCMD based on the queue identifier information QID_info and the queue status information QSI. For example, the processing status corresponding to the queue identifier QID of “1” may correspond to the first state S1. Accordingly, the storage controller 110 may check that the first read command RD1 is in a processing ready state. That is, the storage controller 110 may determine that the execution of the first read operation corresponding to the first read command RD1 is pending.

Also, the processing status corresponding to the queue identifier QID of “2” may correspond to the second state S2, the processing status corresponding to the queue identifier QID of “4” may correspond to the third state S3, and the processing status corresponding to the queue identifier QID of “5” may correspond to the fourth state S4. Accordingly, the storage controller 110 may determine that the second read operation corresponding to the second read command RD2 is under execution, may determine that the execution of the fourth read operation corresponding to the fourth read command RD4 is completed, and may determine that the execution of the fifth read operation corresponding to the fifth read command RD5 fails.

In other words, the storage controller 110 according to an embodiment of the present disclosure may check the execution status of the operation commands OCMD through the queue status read command QSR.

Figure 13:
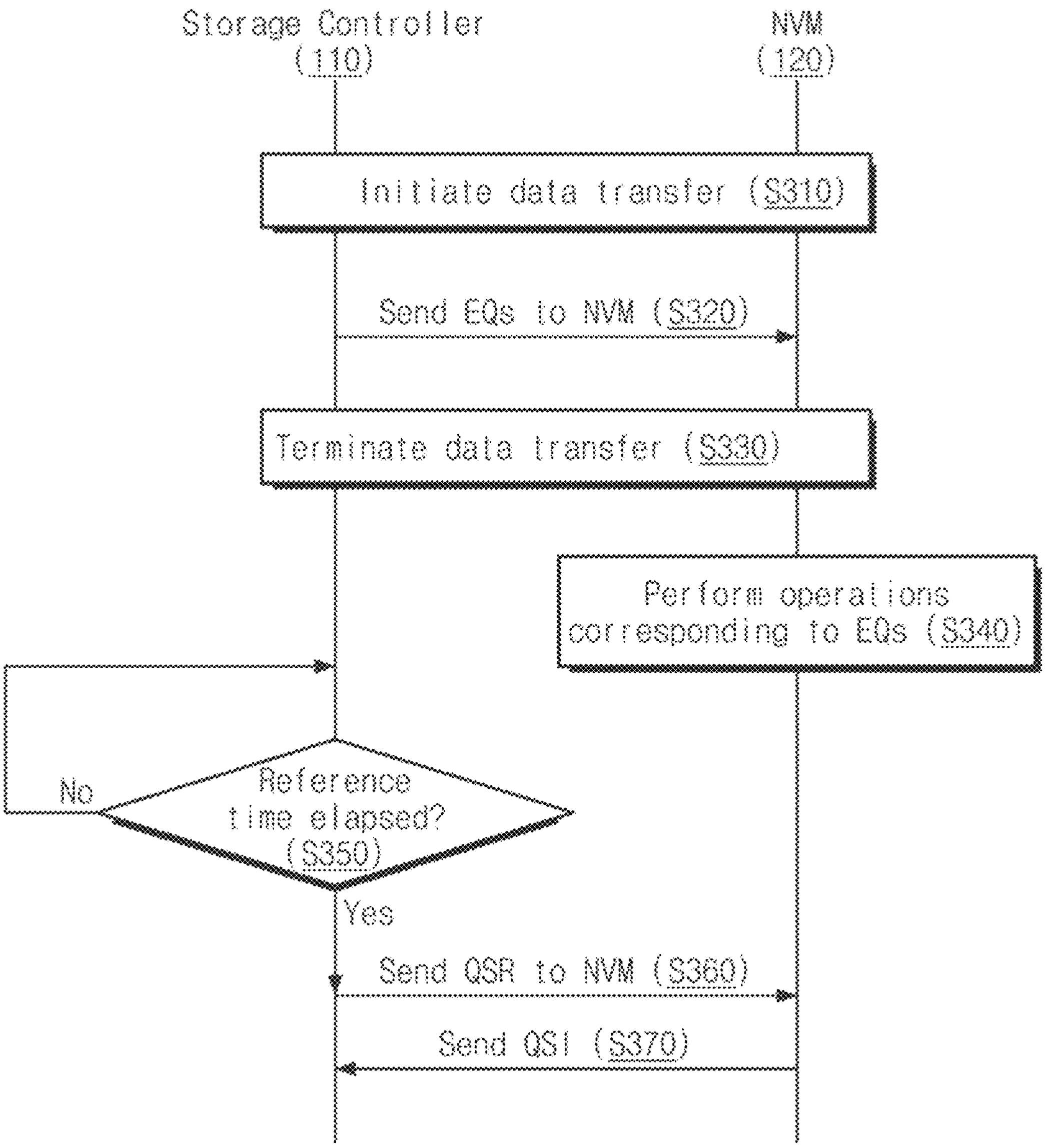
FIG. 13 is a flowchart for describing an example of an operation of a storage device of FIG. 12.

FIG. 13 is a flowchart for describing an example of an operation of a storage device of FIG. 12. Referring to FIG. 13, in operation S310, the storage controller 110 and the nonvolatile memory device 120 may initiate a data transfer. In this case, the storage controller 110 and the nonvolatile memory device 120 may exchange data through the second transfer path DP (refer to FIG. 5).

In operation S320, the storage controller 110 may send the enqueue commands EQs to the nonvolatile memory device 120. In detail, the storage controller 110 may send the enqueue commands (e.g., EQ1 to EQ3 of FIG. 5) in response to requests (e.g., REQ1 to REQ3 of FIG. 5) from the external host 200 (refer to FIG. 5).

In operation S330, the storage controller 110 and the nonvolatile memory device 120 may terminate the data transfer.

In operation S340, the nonvolatile memory device 120 may perform operations corresponding to the enqueue commands EQs. The nonvolatile memory device 120 may perform the operations corresponding to the enqueue commands EQs regardless of the order of receiving the enqueue commands EQs. In detail, the nonvolatile memory device 120 may check the command queue 123*a* (refer to FIG. 1), may perform command reordering, and may perform operations corresponding to an operation command (e.g., OCMD of FIG. 5) stored in the command queue 123*a* (refer to FIG. 1).

In operation S350, the storage controller 110 may determine whether a reference time elapses. For example, the storage controller 110 may determine whether the reference time elapsed from a point in time when the data transfer is terminated (e.g., from a point in time when it is determined in operation S330 that the data transfer is terminated). For example, the reference time may be a preset time. In an embodiment, the reference time may mean an average time necessary to perform the read operation. When the reference time elapses, the storage controller 110 may send the queue status read command QSR to the nonvolatile memory device 120 (S360). When the reference time does not elapse, the storage controller 110 may not send the queue status read command QSR to the nonvolatile memory device 120.

In operation S370, the nonvolatile memory device 120 may send the queue status information QSI to the storage controller 110 in response to the queue status read command QSR.

As described above, when the reference time does not elapse, the storage controller 110 according to an embodiment of the present disclosure may not send the queue status read command QSR to the nonvolatile memory device 120. That is, before the execution of operations corresponding to entries stored in the command queue 123*a* of the nonvolatile memory device 120 is completed, the storage controller 110 may not send the queue status read command QSR to the nonvolatile memory device 120. Accordingly, the nonvolatile memory device 120 may not unnecessarily send the queue status information QSI to the storage controller 110. Accordingly, a storage device including a nonvolatile memory device with improved performance, an operating method thereof, and an operating method of the nonvolatile memory device are provided. However, the present disclosure is not limited thereto. For example, the storage controller 110 may send the queue status read command QSR in various manners.

Figure 14:
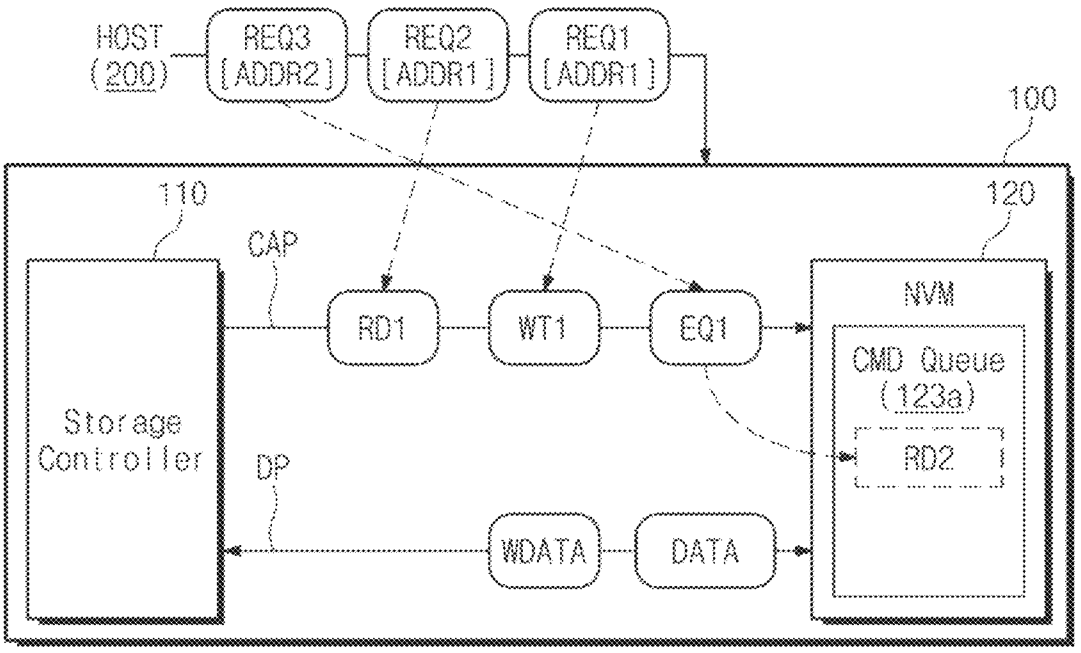
FIG. 14 is a diagram for describing another example of an operation of a storage device of FIG. 1.

FIG. 14 is a diagram for describing another example of an operation of a storage device of FIG. 1. FIG. 14 will be described with reference to FIGS. 1 to 3 and 5 to 13. Referring to FIG. 14, for example, the storage device 100 may receive the first to third requests REQ1 to REQ3 from the host 200 while the data transfer is being performed (i.e., while the storage controller 110 and the nonvolatile memory device 120 are exchanging the data "DATA" through the second transfer path DP). For example, the first request REQ1 may be a request for the write operation associated with the first address ADDR1. For example, the second request REQ2 may be a request for the first read operation associated with the first address ADDR1. For example, the third request REQ3 may be a request for the second read operation associated with the second address ADDR2.

A write command WT should be sent to the nonvolatile memory device 120 together with write data WDATA. Accordingly, the storage controller 110 may fail to send the write command WT to the nonvolatile memory device 120 while the data "DATA" are being sent/received.

In contrast, the storage controller 110 does not send the read/erase command together with data. Accordingly, the storage controller 110 may send the enqueue command EQ including the read command or the erase command to the nonvolatile memory device 120 while the data "DATA" are being sent/received.

In an embodiment, the storage controller 110 may send a first write command WT1 to the nonvolatile memory device 120 in response to the first request REQ1, may send the first read command RD1 to the nonvolatile memory device 120 in response to the second request REQ2, and may send the first enqueue command EQ1 to the nonvolatile memory device 120 in response to the third request REQ3. For example, the first enqueue command EQ1 may include the second read command RD2.

In an embodiment, the storage controller 110 may send the first enqueue command EQ1 to the nonvolatile memory device 120 while the data "DATA" are sent/received. Also, after the transmission/reception of the data "DATA" is completed, the storage controller 110 may sequentially send the first write command WT1 and the first read command RD1 to the nonvolatile memory device 120.

In this case, after the transmission/reception of the data "DATA" is completed, the nonvolatile memory device 120 may perform the second read operation based on the second read command RD2 stored in the command queue 123*a*. Afterwards, the nonvolatile memory device 120 may sequentially perform the first write operation and the first read operation based on the first write command WT1 and the first read command RD1.

In other words, according to an embodiment of the present disclosure, while the data "DATA" are being sent/received, the storage controller 110 may receive a request (e.g., REQ1) corresponding a write command (e.g., WT1) from the host 200 and may then receive requests (e.g., REQ2 and REQ3) corresponding to read commands (e.g., RD1 and RD2). In this case, for example, an address (e.g., ADDR2) of a read command (e.g., RD2) may be different from an address (e.g., ADDR1) of a write command (e.g., WT1). In this case, while the data "DATA" are being sent/received, the storage controller 110 may send an enqueue command (e.g., EQ1) including the read command (e.g., RD2) to the nonvolatile memory device 120 prior to the write command (e.g., WT1).

In contrast, for example, an address (e.g., ADDR1) of a read command (e.g., RD1) may be the same as an address (e.g., ADDR1) of a write command (e.g., WT1). In this case, the storage controller 110 may not generate an enqueue command including a read command (e.g., RD1). Accordingly, the storage controller 110 may prevent the read operation from being performed before the write operation on the same address (e.g., ADDR1) is performed.

Figure 15:
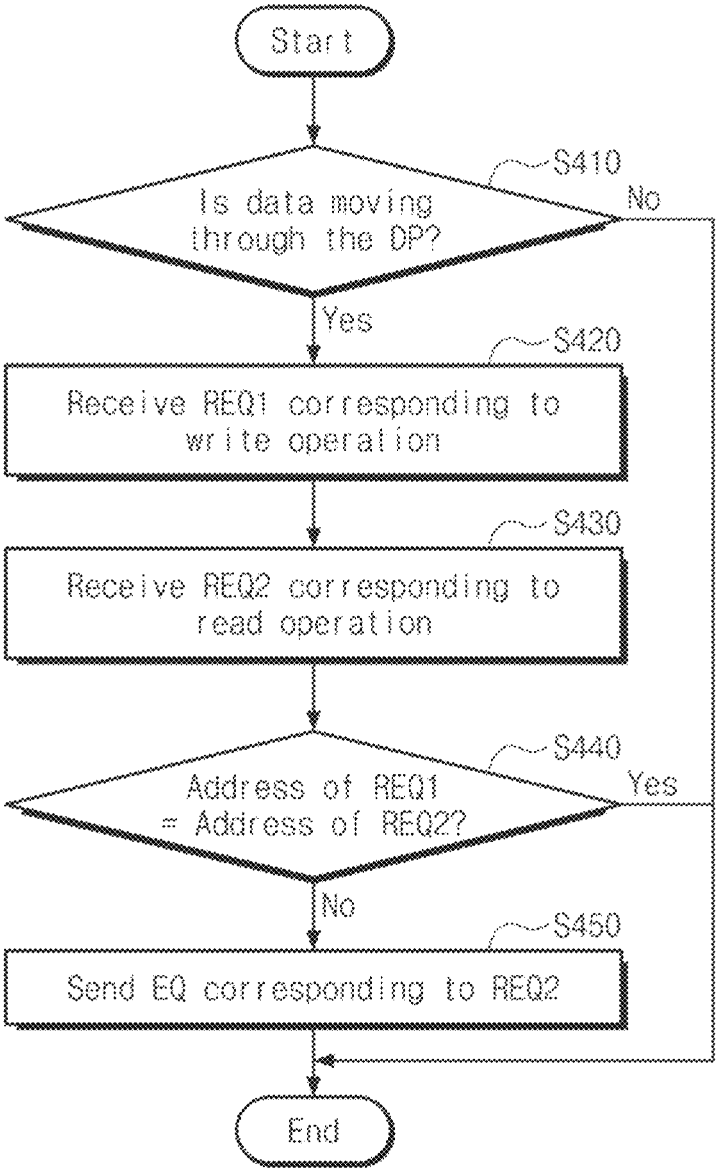
FIG. 15 is a flowchart for describing an operation of a storage controller of FIG. 14.

FIG. 15 is a flowchart for describing an operation of a storage controller of FIG. 14. In operation S410, the storage controller 110 may determine whether data are being transferred through the second transfer path DP. When the data are being transferred, the storage controller 110 may perform operation S420.

In operation S420, the storage controller 110 may receive the first request REQ1 corresponding to the write operation from an external host.

In operation S430, the storage controller 110 may receive the second request REQ2 corresponding to the read operation from the external host.

In operation S440, the storage controller 110 may determine whether an address of the first request REQ1 is the same as an address of the second request REQ2. When the address of the first request REQ1 is different from the address of the second request REQ2, the storage controller 110 may send the enqueue command EQ corresponding to the second request REQ2 to the nonvolatile memory device 120 (S450). For example, the enqueue command EQ may include the read command for the read operation associated with the second request REQ2. When the address of the first request REQ1 is the same as the address of the second request REQ2, the storage controller 110 may not send the enqueue command EQ to the nonvolatile memory device 120.

Figure 16:
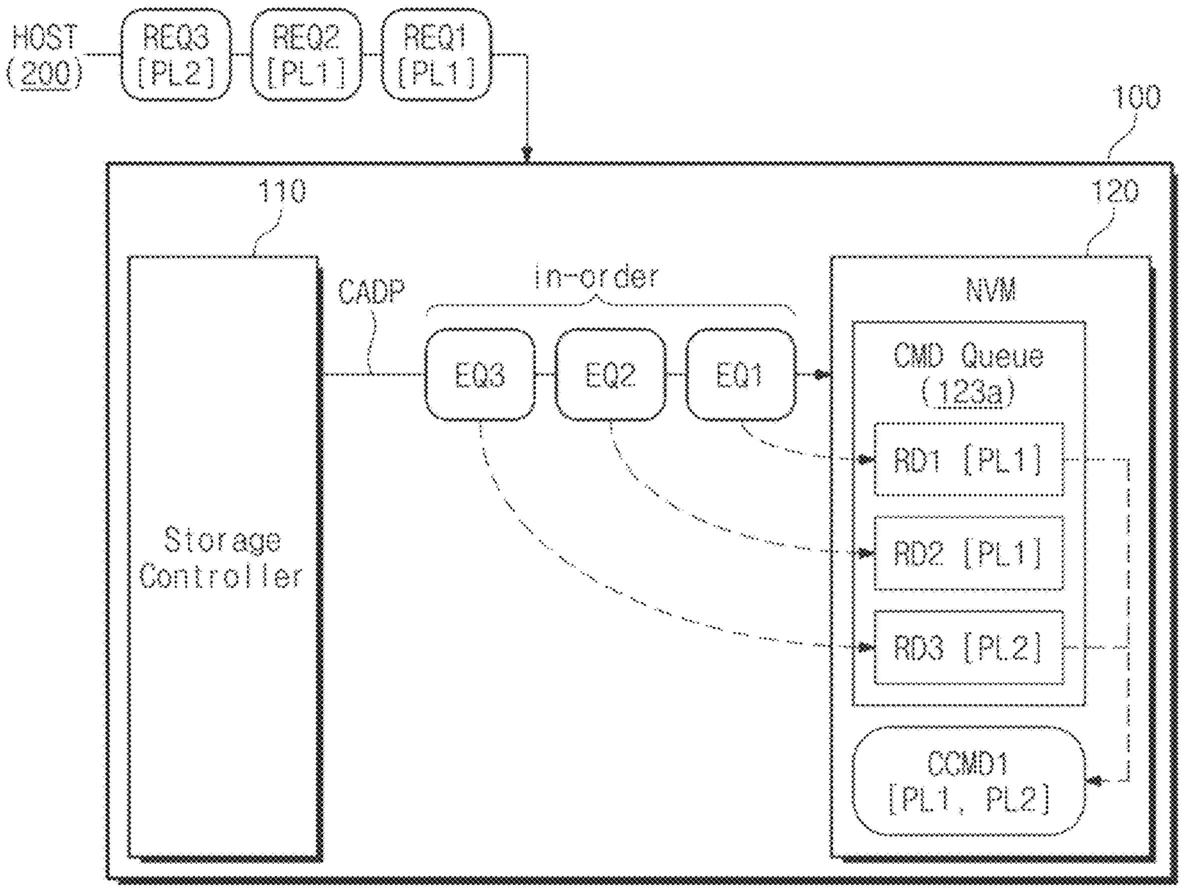
FIG. 16 is a diagram for describing another example of an operation of a storage device according to an embodiment of the present disclosure.

FIG. 16 is a diagram for describing another example of an operation of a storage device according to an embodiment of the present disclosure. Referring to FIG. 16, a storage device 100 may include a storage controller 110 and a non-volatile memory device 120. Referring to FIG. 16, unlike the case of FIG. 5, the storage controller 110 and the nonvolatile memory device 120 may exchange a command, an address, and data through one transfer path CADP.

Referring again to FIG. 16, the storage device 100 may sequentially receive the first to third requests REQ1 to REQ3 from the external host 200.

For example, the first request REQ1 may be a request for the first read operation of the first plane PL1, the second request REQ2 may be a request for the second read operation of the first plane PL1, and the third request REQ3 may be a request for the third read operation of the second plane PL2.

The storage controller 110 may generate the first to third enqueue command commands EQ1 to EQ3 corresponding to the first to third requests REQ1 to REQ3 in response to the first to third requests REQ1 to REQ3. For example, the first enqueue command EQ1 may correspond to the first request REQ1 and may be a command for the first read operation, the second enqueue command EQ2 may correspond to the second request REQ2 and may be a command for the second read operation, and the third enqueue command EQ3 may correspond to the third request REQ3 and may be a command for the third read operation.

For example, during a first time interval, the storage controller 110 may send the first to third enqueue commands EQ1 to EQ3 to the nonvolatile memory device 120 in order. As described with reference to FIG. 5, the nonvolatile memory device 120 may store the first to third read commands RD1 to RD3 in the command queue 123*a* (refer to FIG. 5) in response to the first to third enqueue commands EQ1 to EQ3.

During the first time interval, the storage controller 110 and the nonvolatile memory device 120 may not perform the data transmission/reception. However, the nonvolatile memory device 120 may perform an internal operation. For example, the internal operation may mean an operation, which does not require the data transmission/reception through the transmission path CADP, such as an erase operation. That is, when the nonvolatile memory device 120 performs the internal operation without the data transmission/reception through the transmission path CADP, the storage controller 110 may send enqueue commands (e.g., EQ1 to EQ3) to the nonvolatile memory device 120.

In this case, after the internal operation of the nonvolatile memory device 120 is completely performed, the storage controller 110 may not separately send the first to third read commands RD1 to RD3 to the nonvolatile memory device 120. Accordingly, the performance of the storage device 100 may be improved.

For example, after the internal operation is completely performed, the nonvolatile memory device 120 may generate the first combined command CCMD1 based on the first read command RD1 and the third read command RD3. Afterwards, the nonvolatile memory device 120 may simultaneously perform the first and third read operations based on the first combined command CCMD1. After the first and third read operations are completely performed, the nonvolatile memory device 120 may perform the second read operation based on the second read command RD2. That is, the nonvolatile memory device 120 may independently combine the operation commands RD1 to RD3 and may change the order of processing the operation commands RD1 to RD3.

Figure 17:
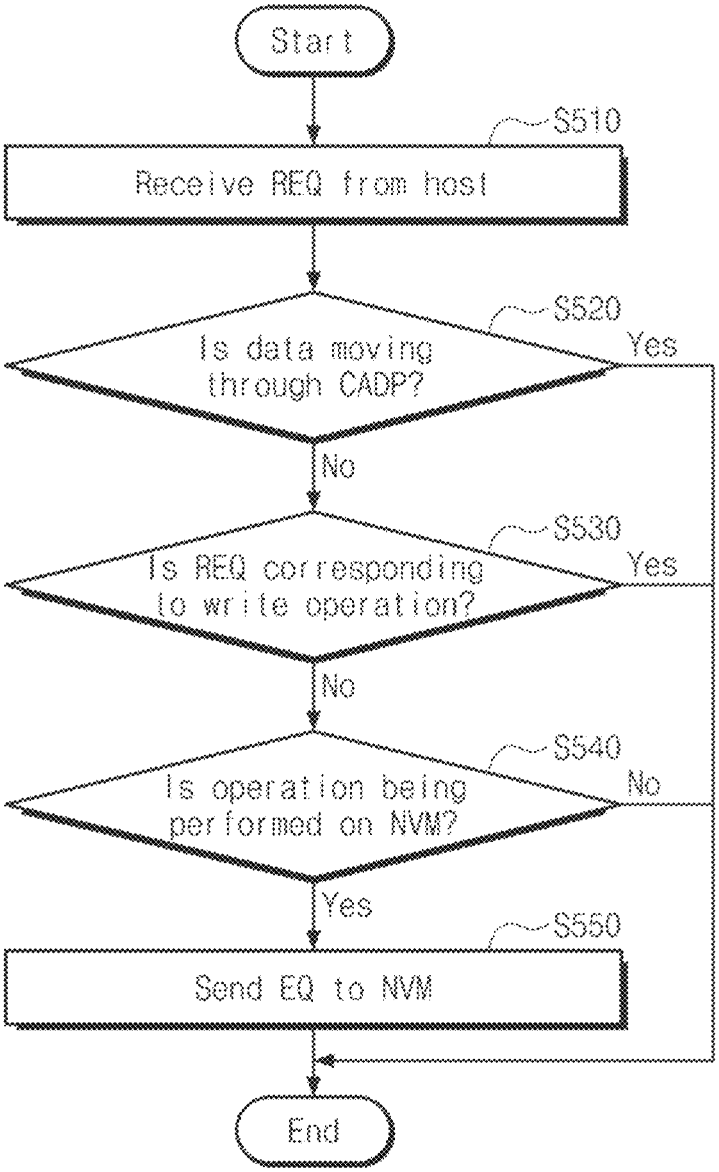
FIG. 17 is a flowchart for describing an operation of a storage controller of FIG. 16.

FIG. 17 is a flowchart for describing an operation of a storage controller of FIG. 16. Referring to FIG. 17, in operation S510, the storage controller 110 may receive the request REQ from the external host 200.

In operation S520, the storage controller 110 may determine whether data are being transferred through the transfer path CADP. When the data are being transferred, the storage controller 110 may not generate the enqueue command EQ. When the data are not being transferred, the storage controller 110 may perform operation S530.

In operation S530, the storage controller 110 may determine whether the request REQ corresponds to the write operation. When the request REQ corresponds to the write operation, the storage controller 110 may not generate the enqueue command EQ. When the request REQ does not correspond to the write operation, the storage controller 110 may perform operation S540.

In operation S540, the storage controller 110 may determine whether the internal operation is being performed in the nonvolatile memory device 120. When the internal operation is being performed, the storage controller 110 may send the enqueue command EQ to the nonvolatile memory device 120. When the internal operation is not being performed, the storage controller 110 may not generate the enqueue command EQ.

Figure 18:
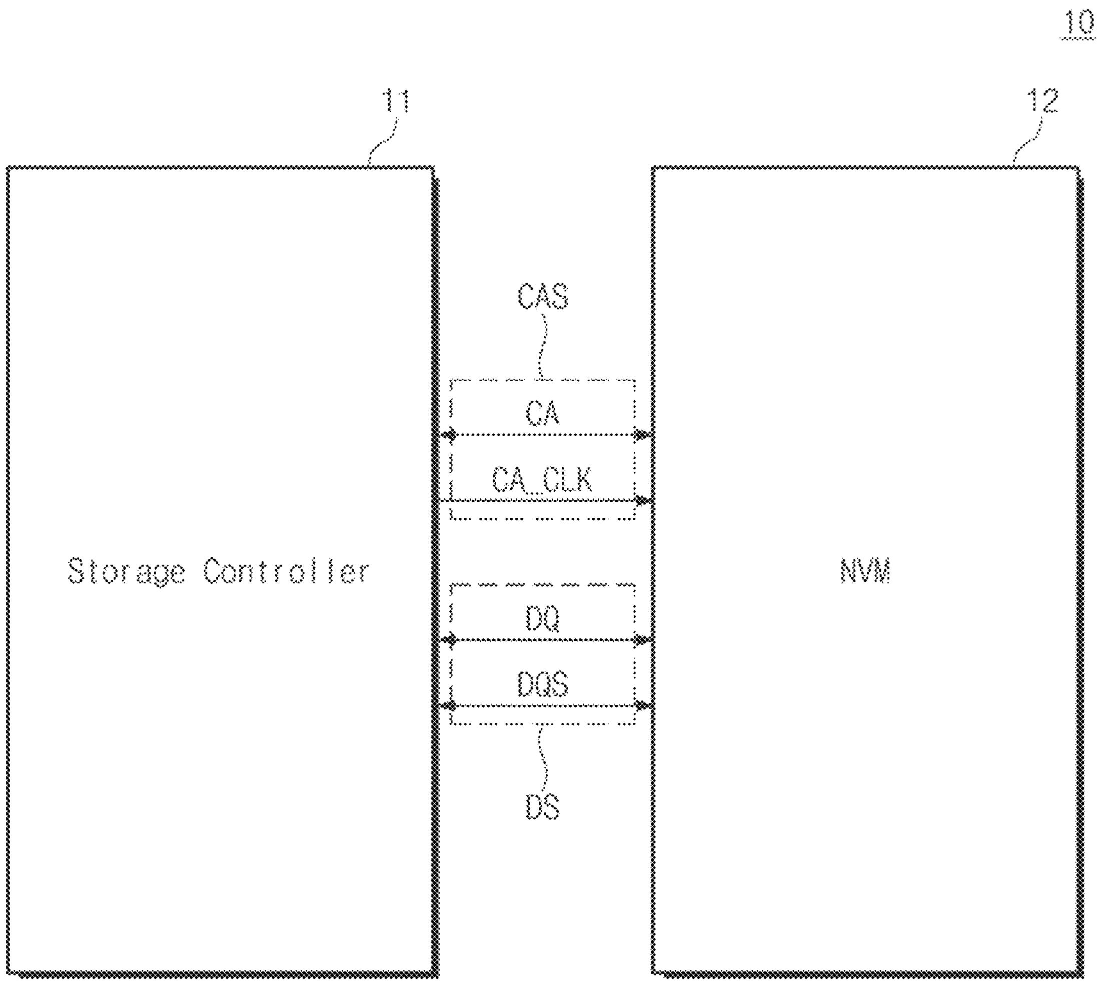
FIG. 18 is a block diagram illustrating a storage device according to an embodiment of the present disclosure.

FIG. 18 is a block diagram illustrating a storage device according to an embodiment of the present disclosure. Referring to FIG. 18, a storage device 10 may include a storage controller 11 and a nonvolatile memory device 12. The storage controller 11 may correspond to the storage controller 110 of FIG. 1. The nonvolatile memory device 12 may correspond to the nonvolatile memory device 120 of FIG. 1.

That is, the nonvolatile memory device 12 may combine operation commands (e.g., OCMD of FIG. 5) received from the storage controller 11 and may change the order of processing the received commands. In other words, the nonvolatile memory device 12 may process the commands received from the storage controller 11 in the out-of-order manner.

In an embodiment, the nonvolatile memory device 12 may receive a command/address CA and a command/address clock signal CA_CLK from the storage controller 11. For example, the nonvolatile memory device 12 may obtain a command and an address from the command/address CA based on the toggle timing of the command/address clock signal CA_CLK. The nonvolatile memory device 12 may receive a data signal DQ and a data strobe signal DQS from the storage controller 11. For example, the nonvolatile memory device 12 may obtain data from the data signals DQ based on the toggle timing of the data strobe signal DQS.

As described with reference to FIG. 5, the command/address pin and the data input/output pin may be physically distinguished from each other. Accordingly, a path through which signals CAS associated with the command/address are transferred may be different from a path through which signals DS associated with the data are transferred. In detail, for example, the command/address CA may be transferred through the first transfer path CAP (refer to FIG. 5), and the data signal DQ may be transferred through the second transfer path DP (refer to FIG. 5). Accordingly, according to an embodiment of the present disclosure, the storage controller 11 may send the command/address CA to the nonvolatile memory device 12 while data are being transferred through the data signal DQ.

Figure 19:
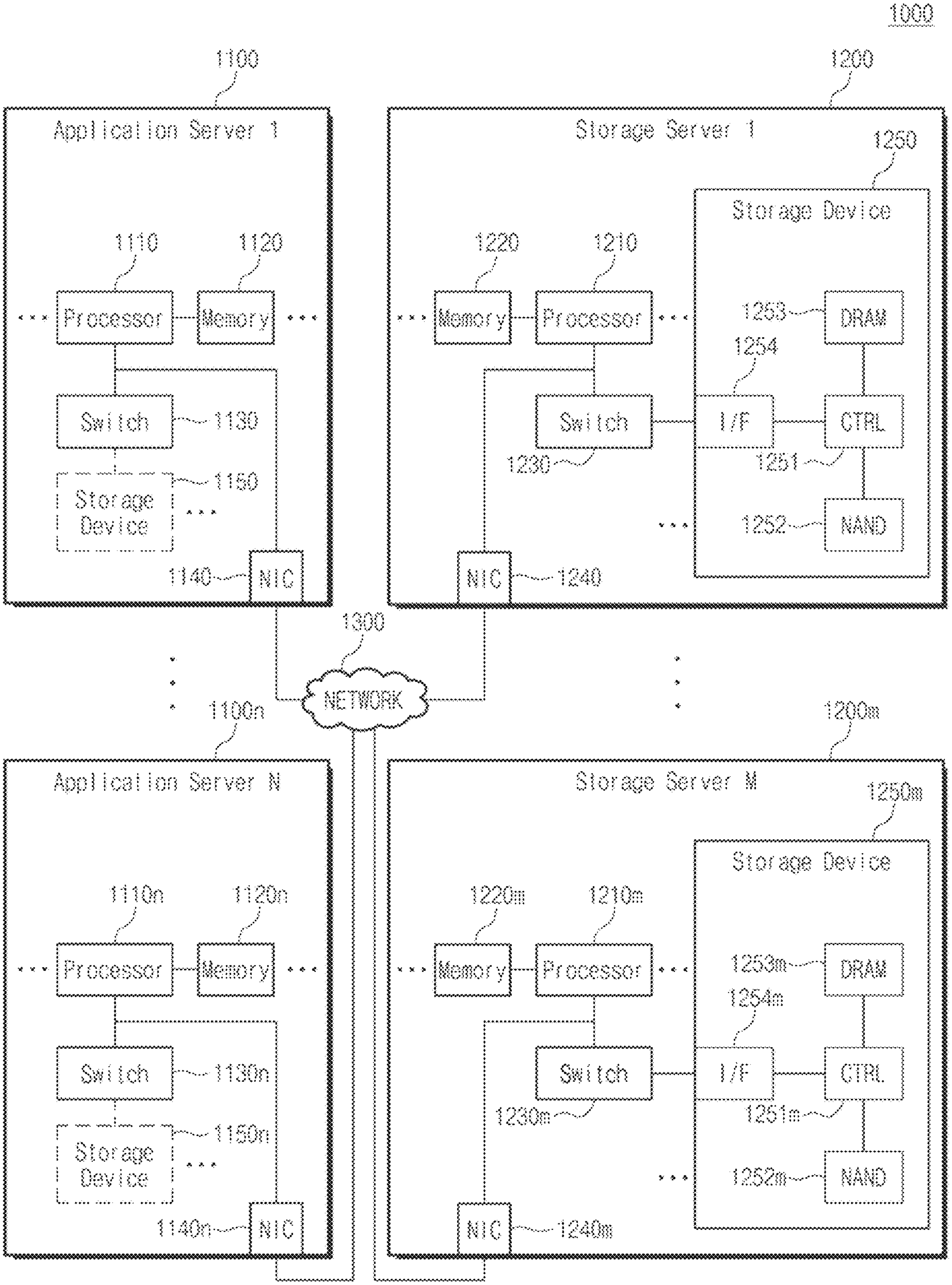
FIG. 19 is a diagram illustrating a data center to which a memory device according to an embodiment of the present disclosure is applied.

FIG. 19 is a diagram of a data center 3000 to which a memory device is applied, according to an embodiment.

Referring to FIG. 10, the data center 1000 may be a facility that collects various types of pieces of data and provides services and be referred to as a data storage center. The data center 1000 may be a system for operating a search engine and a database, and may be a computing system used by companies, such as banks, or government agencies. The data center 1000 may include application servers 1100 to 1100*n* and storage servers 1200 to 1200*m*. The number of application servers 1100 to 1100*n* and the number of storage servers 1200 to 1200*m* may be variously selected according to embodiments. The number of application servers 1100 to 1100*n* may be different from the number of storage servers 1200 to 1200*m*.

The application server 1100 or the storage server 1200 may include at least one of processors 1110 and 1210 and memories 1120 and 1220. The storage server 1200 will now be described as an example. The processor 1210 may control all operations of the storage server 1200, access the memory 1220, and execute instructions and/or data loaded in the memory 1220. The memory 1220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In one or more embodiments, the numbers of processors 1210 and memories 1220 included in the storage server 1200 may be variously selected. In an embodiment, the processor 1210 and the memory 1220 may provide a processor-memory pair. In an embodiment, the number of processors 1210 may be different from the number of memories 1220. The processor 1210 may include a single-core processor or a multi-core processor. The above description of the storage server 1200 may be similarly applied to the application server 1100. In one or more embodiments, the application server 1100 may not include a storage device 1150. The storage server 1200 may include at least one storage device 1250. The number of storage devices 1250 included in the storage server 1200 may be variously selected according to embodiments.

In an embodiment, the storage device 1250 may correspond to the storage device 100 of FIG. 1. For example, the NAND flash memory 1252 may independently combine commands from the controller 1251 and may adjust the processing order of the commands.

The application servers 1100 to 1100*n* may communicate with the storage servers 1200 to 1200*m* through a network 1300. The network 1300 may be implemented by using a fiber channel (FC) or Ethernet. In this case, the FC may be a medium used for relatively high-speed data transmission and use an optical switch with high performance and high availability. The storage servers 1200 to 1200*m* may be provided as file storages, block storages, or object storages according to an access method of the network 1300.

In an embodiment, the network 1300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 1300 may be a general network, such as a TCP/IP network. For example, the network 1300 may be implemented according to a protocol, such as FC over Ethernet (FCOE), network attached storage (NAS), and NVMe over Fabrics (NVMe-oF).

Hereinafter, the application server 1100 and the storage server 3200 will mainly be described. A description of the application server 1100 may be applied to another application server 1100*n*, and a description of the storage server 1200 may be applied to another storage server 1200*m*.

The application server 1100 may store data, which is requested by a user or a client to be stored, in one of the storage servers 1200 to 1200*m* through the network 1300. Also, the application server 1100 may obtain data, which is requested by the user or the client to be read, from one of the storage servers 1200 to 1200*m* through the network 1300. For example, the application server 1100 may be implemented as a web server or a database management system (DBMS).

The application server 1100 may access a memory 1120*n* or a storage device 1150*n*, which is included in another application server 1100*n*, through the network 1300. Alternatively, the application server 1100 may access memories 1220 to 1220*m* or storage devices 1250 to 1250*m*, which are included in the storage servers 1200 to 1200*m*, through the network 1300. Thus, the application server 1100 may perform various operations on data stored in application servers 1100 to 1100*n* and/or the storage servers 1200 to 1200*m*. For example, the application server 1100 may execute an instruction for moving or copying data between the application servers 1100 to 1100*n* and/or the storage servers 1200 to 1200*m*. In this case, the data may be moved from the storage devices 1250 to 1250*m* of the storage servers 1200 to 1200*m* to the memories 1120 to 1120*n* of the application servers 1100 to 1100*n* directly or through the memories 1220 to 1220*m* of the storage servers 1200 to 1200*m*. The data moved through the network 1300 may be data encrypted for security or privacy.

The storage server 1200 will now be described as an example. An interface 1254 may provide physical connection between a processor 1210 and a controller 1251 and a physical connection between a network interface card (NIC) 1240 and the controller 1251. For example, the interface 1254 may be implemented using a direct attached storage (DAS) scheme in which the storage device 1250 is directly connected with a dedicated cable. For example, the interface 1254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 1200 may further include a switch 1230 and the NIC (Network InterConnect) 1240. The switch 1230 may selectively connect the processor 1210 to the storage device 1250 or selectively connect the NIC 1240 to the storage device 1250 via the control of the processor 1210.

In an embodiment, the NIC 1240 may include a network interface card and a network adaptor. The NIC 1240 may be connected to the network 1300 by a wired interface, a wireless interface, a Bluetooth interface, or an optical interface. The NIC 1240 may include an internal memory, a digital signal processor (DSP), and a host bus interface and be connected to the processor 1210 and/or the switch 1230 through the host bus interface. The host bus interface may be implemented as one of the above-described examples of the interface 1254. In an embodiment, the NIC 1240 may be integrated with at least one of the processor 1210, the switch 1230, and the storage device 1250.

In the storage servers 1200 to 1200*m* or the application servers 1100 to 1100*n*, a processor may transmit a command to storage devices 1150 to 1150*n* and 1250 to 1250*m* or the memories 1120 to 1120*n* and 1220 to 1220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 1150 to 1150*n* and 1250 to 1250*m* may transmit a control signal and a command/address signal to NAND flash memory devices 1252 to 1252*m* in response to a read command received from the processor. Thus, when data is read from the NAND flash memory devices 1252 to 1252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 1251 may control all operations of the storage device 1250. In an embodiment, the controller 1251 may include SRAM. The controller 1251 may write data to the NAND flash memory device 1252 in response to a write command or read data from the NAND flash memory device 1252 in response to a read command. For example, the write command and/or the read command may be provided from the processor 1210 of the storage server 1200, the processor 1210*m* of another storage server 1200*m*, or the processors 1110 and 1110*n* of the application servers 1100 and 1100*n*. DRAM 1253 may temporarily store (or buffer) data to be written to the NAND flash memory device 1252 or data read from the NAND flash memory device 1252. Also, the DRAM 1253 may store metadata. Here, the metadata may be user data or data generated by the controller 1251 to manage the NAND flash memory device 1252. The storage device 1250 may include a secure element (SE) for security or privacy.

The controller 1251 may be implemented as a digital signal processor (DSP) processing digital signals, a microprocessor, and a time controller (TCON). However, the disclosure is not limited thereto, and the controller 1251 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the controller 1251 may be implemented as a system on chip (SoC) having a processing algorithm stored therein or large scale integration (LSI), or in the form of a field programmable gate array (FPGA). The controller 1251 may perform various functions by executing computer executable instructions stored in a cache or a memory.

According to an embodiment of the present disclosure, a nonvolatile memory device may receive commands from a storage controller in order. The nonvolatile memory device may combine the commands and may adjust the order of processing the commands. In other words, the nonvolatile memory device may independently implement an out-of-order operation. Accordingly, a storage device including a nonvolatile memory device with improved performance, an operating method thereof, and an operating method of the nonvolatile memory device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:

a nonvolatile memory device comprising a first plane and a second plane; and a storage controller configured to sequentially send to the nonvolatile memory device a first command corresponding to a first operation of the first plane, a second command corresponding to a second operation of the first plane, and a third command corresponding to a third operation of the second plane in response to a first request, a second request, and a third request sequentially received from an external host device, wherein the first request corresponds to the first command, the second request corresponds to the second command, and the third request corresponds to the third command, wherein the nonvolatile memory device is configured to:

sequentially receive the first command, the second command, and the third command from the storage controller, perform the third operation prior to the second operation based on the first, the second, and the third commands regardless of an order in which the first command, the second command, and the third command are received, store a first operation command corresponding to the first operation in a command queue in response to the first command, store a second operation command corresponding to the second operation in the command queue in response to the second command, store a third operation command corresponding to the third operation in the command queue in response to the third command, and generate a first combined command corresponding to the first plane and the second plane based on a processing priority of the first operation command being identical to a processing priority of the third operation command, and wherein the nonvolatile memory device further comprises a command reorder module configured to determine a processing order of the first command, the second command, and the third command.

2. The storage device of claim 1, wherein the storage controller is further configured to:

transmit data to, or receive data from, the nonvolatile memory device through a first transfer path, and send the first, the second, and the third commands to the nonvolatile memory device through a second transfer path.

3. The storage device of claim 1, wherein the first, the second, and the third operations are not a write operation of the nonvolatile memory device.

4. The storage device of claim 1, wherein the nonvolatile memory device is further configured to generate the first combined command based on the processing priority of each of the first and the third operation commands, a processing priority of the second operation command, a plane corresponding to each of the first, the second, and the third operation commands, and an operation type of each of the first, the second, and the third operation commands.

5. The storage device of claim 4, wherein the nonvolatile memory device is further configured to generate the first combined command by combining the first operation command and the third operation command based on:

the operation type of the first operation command being identical to the operation type of the third operation command, and the plane corresponding to the first operation command being different from the plane corresponding to the third operation command.

6. The storage device of claim 4, wherein the nonvolatile memory device is further configured to identify an order of processing the first combined command and the second operation command based on the processing priority of each of the first, the second, and the third operation commands.

7. The storage device of claim 1, wherein the storage controller is further configured to:

send the first, the second, and the third commands to the nonvolatile memory device while transmitting data to, or receiving data from, the nonvolatile memory device.

8. The storage device of claim 1, wherein the storage controller is further configured to send a fourth command to the nonvolatile memory device, wherein the nonvolatile memory device is further configured to send queue status information to the storage controller in response to the fourth command, and wherein the queue status information comprises information about a processing state of each of the first, the second, and the third operation commands.

9. The storage device of claim 8, wherein the storage controller is further configured to identify, based on the queue status information, whether the first, the second, and the third operations are completely performed.

10. The storage device of claim 8, wherein the storage controller is further configured to, based on data transmission to or data reception from the nonvolatile memory device terminating for period greater than or equal to a reference time, send the fourth command.

11. A method of operating a storage device, the method comprising:

sequentially receiving, from an external host device, a first request, a second request, and a third request;

sequentially sending to a nonvolatile memory device of the storage device, by a storage controller of the storage device, a first command corresponding to a first operation of a first plane of the nonvolatile memory device, a second command corresponding to a second operation of the first plane, and a third command corresponding to a third operation of a second plane of the nonvolatile memory device, wherein the first command corresponds to the first request, the second command corresponds to the second request, the third command corresponds to the third request;

sequentially receiving, by the nonvolatile memory device, the first command, the second command, and the third command;

determining, by the nonvolatile memory device, a processing order of the first command, the second command, and the third command, regardless of an order in which the first command, the second command, and the third command are received;

performing, by the nonvolatile memory device, the third operation prior to the second operation based on the determined processing order;

queuing in a command queue, by the nonvolatile memory device, a first operation command corresponding to the first operation in response to the first command;

queuing in the command queue, by the nonvolatile memory device, a second operation command corresponding to the second operation in response to the second command;

queuing in the command queue, by the nonvolatile memory device, a third operation command corresponding to the third operation in response to the third command; and generating, by the nonvolatile memory device, a first combined command corresponding to the first operation command and the third operation command based on a processing priority of the first operation command being identical to a processing priority of the third operation command.

12. The method of claim 11, further comprising:

transmitting data, by the storage controller, to the nonvolatile memory device through a first transfer path;

receiving data, by the storage controller, from the nonvolatile memory device through the first transfer path; and sending, by the storage controller, the first, the second, and the third commands to the nonvolatile memory device through a second transfer path.

13. The method of claim 11, further comprising:

identifying an order of processing the first combined command and the second operation command, wherein the first combined command comprises a multiplane command related to the first plane and the second plane.

14. The method of claim 13, wherein the generating the first combined command further comprises:

identifying whether an operation type of the first operation command is identical to an operation type of the third operation command.

15. The method of claim 14, wherein the identifying the order of processing the first combined command and the second operation command comprises:

comparing the processing priorities of the first operation command and the third operation command with a processing priority of the second operation command.

16. The method of claim 15, further comprising:

sending, by the storage controller, a fourth command to the nonvolatile memory device; and sending, by the nonvolatile memory device, queue status information to the storage controller in response to the fourth command, wherein the queue status information comprises information about a processing state of each of the first, the second, and the third operation commands.

17. A method of operating a nonvolatile memory device which includes a first plane and a second plane, the method comprising:

sequentially receiving a first command corresponding to a first operation of the first plane, a second command corresponding to a second operation of the first plane, and a third command corresponding to a third operation of the second plane;

queuing, in a command queue, a first operation command corresponding to the first command, a second operation command corresponding to the second command, and a third operation command corresponding to the third command, wherein the first, the second, and the third operation commands are queued in an order in which the first, the second, and the third operation commands are received;

determining a processing order of the first command, the second command, and the third command, regardless of an order in which the first command, the second command, and the third command are received;

performing the first, the second, and the third operations based on the determined processing order; and generating a first combined command corresponding to the first operation command and the third operation command based on a processing priority of the first operation command being identical to a processing priority of the third operation command, wherein the first command, the second command, and the third command correspond to a first request, a second request and a third request generated by an external host device, respectively, and are generated by an external storage controller.

18. The method of claim 17, wherein the first, the second, and the third operations are not a write operation of the nonvolatile memory device.

* * * * *